United States Patent
Yoshida et al.

(10) Patent No.: US 8,363,146 B2
(45) Date of Patent: Jan. 29, 2013

(54) IMAGE-TAKING APPARATUS AND OUTPUT IMAGE GENERATION METHOD

(76) Inventors: Hiroaki Yoshida, Takatsuki (JP); Yukio Mori, Hirakata (JP); Yasuhachi Hamamoto, Moriguchi (JP); Seiji Okada, Hirakata (JP); Satoru Takeuchi, Katano (JP); Masahiro Yokohata, Osaka (JP)

( * ) Notice: Subject to any disclaimer, the term of this patent is extended or adjusted under 35 U.S.C. 154(b) by 371 days.

(21) Appl. No.: 11/831,142

(22) Filed: Jul. 31, 2007

(65) Prior Publication Data

US 2008/0024620 A1   Jan. 31, 2008

(30) Foreign Application Priority Data

Jul. 31, 2006 (JP) .................................. 2006-207809

(51) Int. Cl.
*H04N 5/222* (2006.01)
(52) U.S. Cl. ................................ 348/333.12
(58) Field of Classification Search ............. 348/333.12; 382/103
See application file for complete search history.

(56) References Cited

U.S. PATENT DOCUMENTS

| 5,835,641 | A |   | 11/1998 | Sotoda et al. |
| 7,376,347 | B2 | * | 5/2008 | Sugimoto ...................... 396/60 |
| 7,420,601 | B2 | * | 9/2008 | Hong ............................ 348/252 |
| 7,555,141 | B2 | * | 6/2009 | Mori ............................. 382/103 |
| 2003/0071908 | A1 | * | 4/2003 | Sannoh et al. ................ 348/345 |
| 2004/0145670 | A1 | * | 7/2004 | Hong ........................ 348/333.01 |
| 2005/0074185 | A1 | * | 4/2005 | Jung et al. ..................... 382/298 |
| 2005/0219393 | A1 | * | 10/2005 | Sugimoto ................ 348/333.01 |
| 2005/0270399 | A1 |   | 12/2005 | Kawaguchi et al. |
| 2006/0126894 | A1 | * | 6/2006 | Mori ............................. 382/103 |
| 2006/0170793 | A1 | * | 8/2006 | Pasquarette et al. ..... 348/240.99 |

FOREIGN PATENT DOCUMENTS

| JP | 6-217187 A | 8/1994 |
| JP | 2002-33949 A | 1/2002 |
| JP | 2003-101863 A | 4/2003 |
| JP | 2004-282535 A | 10/2004 |
| JP | 2005-348181 A | 12/2005 |
| JP | 2006-26226 | 2/2006 |

OTHER PUBLICATIONS

Japanese Office Action for corresponding JP Application No. 2006-207809, dated Apr. 26, 2011, pp. 1-3.

* cited by examiner

*Primary Examiner* — Aung S Moe
(74) *Attorney, Agent, or Firm* — Ditthavong Mori & Steiner P.C.

(57) ABSTRACT

An image-taking apparatus generates an output image from a photographed image obtained by photographing and displays this output image on a display screen of a display section. The image-taking apparatus includes a recognition processing section for recognizing a specific subject (facial region of a person, or a facial component such as eyes) included in the photographed image. Referring to results of this recognition, the image-taking apparatus evaluates the dimension of the specific subject in each photographed image. If the dimension evaluated is relatively large, a relatively small magnification ratio to be employed upon the generation of the output image from the photographed image is provided. If the dimension evaluated is relatively small, a relatively large magnification ratio to be employed upon the generation of the output image from the photographed image is provided. As a result, the dimension of the specific subject in the output image is kept substantially constant.

7 Claims, 17 Drawing Sheets

IMAGE-TAKING APPARATUS AND OUTPUT IMAGE GENERATION METHOD

This nonprovisional application claims priority under 35 U.S.C. §119(a) on Patent Application No. 2006-207809 filed on Jul. 31, 2006, the entire contents of which are hereby incorporated by reference.

BACKGROUND OF THE INVENTION

1. Field of the Invention

The present invention relates to an image-taking apparatus, such as a digital video camera or the like, and also to an output image generation method for use in such an image-taking apparatus.

2. Description of Related Art

It is commonly practiced to make up one's face while holding a mirror in the hand on a vehicle such as a train. Performing such make-up requires carrying the mirror around. In a case where an image-taking apparatus such as a digital video camera is owned, the photographer herself can be photographed with this image-taking apparatus and the image photographed can be checked on the display screen, thereby permitting use of the digital video camera as a mirror.

However, when the photographed image is simply displayed on the display screen, as is the case with a typical mirror, the subject on the display screen changes relative to shake of the train or the like. Thus, there have been demands for an image-taking apparatus having a more convenient function.

Upon performing, with an image-taking apparatus, moving-image photographing on a subject approaching closer from a great distance, there arises a problem that the subject extends off a photographing region unless the zoom factor or the like is adjusted manually during photographing. In this manual adjustment, the image-taking apparatus moves and thus the photographed image is distorted or the subject is lost in many cases.

These problems are each caused by movement of the subject in relation to the image-taking apparatus. The movement of the subject in the moving-image photographing is a normal phenomenon; therefore, there have been earnest demands for such a technology that solves these problems on the image-taking apparatus side.

SUMMARY OF THE INVENTION

An image-taking apparatus according to one aspect of the present invention includes: an image-taking section for sequentially performing photographing and sequentially outputting an image-taking signal representing a photographed image obtained by photographing; and an image output section for receiving the image-taking signal and sequentially generating and outputting an output image from the photographed image sequentially obtained. The image output section includes a recognition section for recognizing, based on the image-taking signal, a specific subject included in the photographed image. Change reduction processing for reducing, based on results of the recognition by the recognition section, change in a dimension of the specific subject in the output image due to change in a distance in an actual space between the specific subject and the image-taking section is made in an executable manner.

Specifically, for example, the image-taking apparatus may further include a display section for displaying the output image from the image output section. The image output section may execute the change reduction processing to thereby reduce change in a dimension of the specific subject on a display screen of the display section due to change in the distance.

Specifically, for example, the image output section, based on results of the recognition by the recognition section, may evaluate a dimension of the specific subject in the photographed image or a dimension of a related subject which is included in the photographed image and which moves relative to movement of the specific subject, and then may execute the change reduction processing based on the evaluated dimension.

For example, the image output section may compare a predetermined upper dimension limit and the dimension of the specific subject or the related subject in the photographed image, and, if the dimension of the specific subject or the related subject is larger than the upper dimension limit, may prohibit the execution of the change reduction processing to enlarge the dimension of the specific subject in the output image.

For example, the image output section may compare a predetermined lower dimension limit and the dimension of the specific subject or the related subject in the photographed image, and if the dimension of the specific subject or the related subject is smaller than the lower dimension limit, may prohibit the change reduction processing to reduce the dimension of the specific subject in the output image.

For example, the image output section, based on results of the recognition by the recognition section, may evaluate a state of change in a dimension of the specific subject in the photographed image or a state of change in a dimension of a related subject which is included in the photographed image and which moves relative to movement of the specific subject, and determines based on results of the evaluation whether or not to execute the change reduction processing.

For example, the image output section, based on results of the recognition by the recognition section, may evaluate a state of change in a direction of movement of the specific subject in the photographed image with respect to a center of the specific subject or a state of change in a direction of movement of a related subject, which is included in the photographed image and which moves relative to the movement of the specific subject, with respect to a center of the related subject, and may determine based on results of the evaluation whether or not to execute the change reduction processing.

For example, when a dimension of the specific subject in the photographed image changes due to change in the distance during execution of the change reduction processing, the image output section, based on results of the recognition by the recognition section, may control an angle of view for photographing by the image-taking section after the change to thereby reduce the change in the dimension of the specific subject in the output image due to the change.

Another aspect of the invention refers to an output image generation method for receiving from an image-taking section an image-taking signal representing a photographed image obtained by photographing and sequentially generating and outputting an output image from the photographed image sequentially obtained. The output image generation method includes: a recognition step for recognizing a specific subject included in the photographed image based on the image-taking signal; and a change reduction step for reducing, based on results of the recognition by the recognition step, change in a dimension of the specific subject in the output image due to change in a distance in actual space between the specific subject and the image-taking section.

DETAILED DESCRIPTION OF PREFERRED EMBODIMENTS

Hereinafter, the embodiments of the present invention will be described in detail with reference to the accompanying drawings. In all the figures referenced, the same portions are numbered with the same numerals and thus overlapping explanation for the same portions will be omitted basically.

The first and second embodiments will be described later on, and those in common between these embodiments will be first described.

Figure 1:
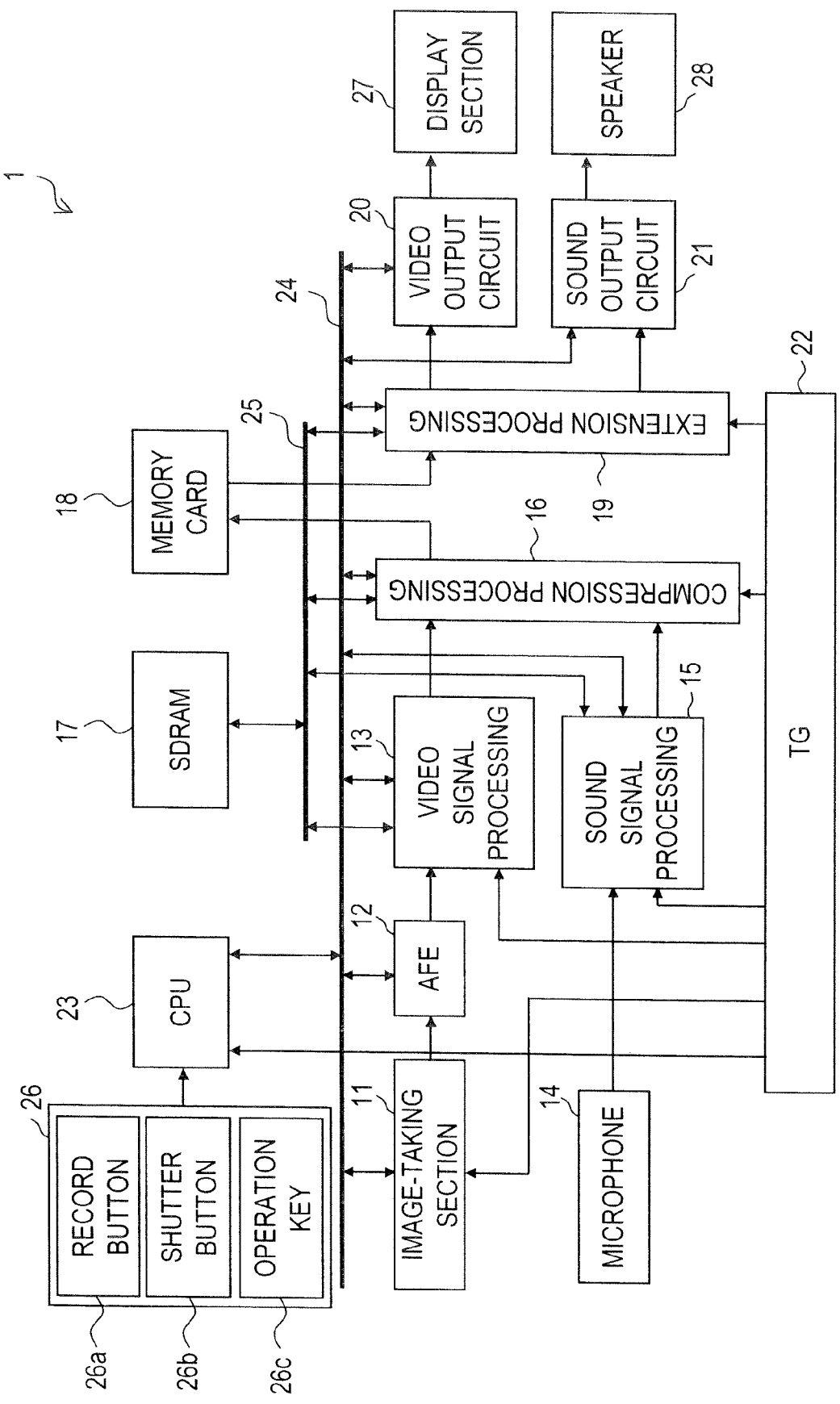
FIG. 1 is an overall block diagram of an image-taking apparatus according to embodiments of the present invention.

FIG. 1 is an overall block diagram of an image-taking apparatus 1 according to the embodiments of the invention. The image-taking apparatus 1 is, for example, a digital video camera. The image-taking apparatus 1 is capable of photographing both a moving image and a still image and also capable of simultaneously photographing a still image while photographing a moving image.

The image-taking apparatus 1 includes: an image taking section 11; an AFE (Analog Front End) 12; a video signal processing section 13, a microphone (sound input section) 14; a sound signal processing section 15; a compression processing section 16; an SDRAM (Synchronous Dynamic Random Access Memory) 17 as one example of an internal memory; a memory card 18; an extension processing section 19; a video output circuit 20; a sound output circuit 21; a TG (Timing generator) 22; a CPU (Central Processing Unit) 23; a bus 24; a bus 25; an operation section 26; a display section 27; and a speaker 28. The operation section 26 has: a record button 26a; a shutter button 26b; an operation key 26c; and the like.

The portions in the image-taking apparatus 1 exchange signals (data) therebetween via the buses 24 and 25.

The TG 22 generates timing control signals for controlling timing of each operation in the entire image-taking apparatus 1, and provides the generated timing control signals to the sections in the image-taking apparatus 1. Specifically, the timing control signals are provided to the image taking section 11, the video signal processing section 13, the sound signal processing section 15, the compression processing section 16, the extension processing section 19, and the CPU 23. The timing control signals include a vertical synchronizing signal Vsync and a horizontal synchronizing signal Hsync.

The CPU 23 integrally controls operations of the different sections in the image-taking apparatus 1. The operation section 26 accepts user operation. Contents of the operation provided to the operation section 26 are transmitted to the CPU 23. The SDRAM 17 functions as a frame memory. The sections in the image-taking apparatus 1 temporarily record various data (digital signals) on the SDRAM 17 as appropriate upon signal processing.

The memory card 18 is an external recording medium, for example, an SD (Secure Digital) memory card. The external recording medium of this embodiment is exemplified by the memory card 18, but may also be formed of one or a plurality of randomly accessible recording mediums (for example, semiconductor memories, memory cards, optical discs, magnetic discs, or the like).

Figure 2:
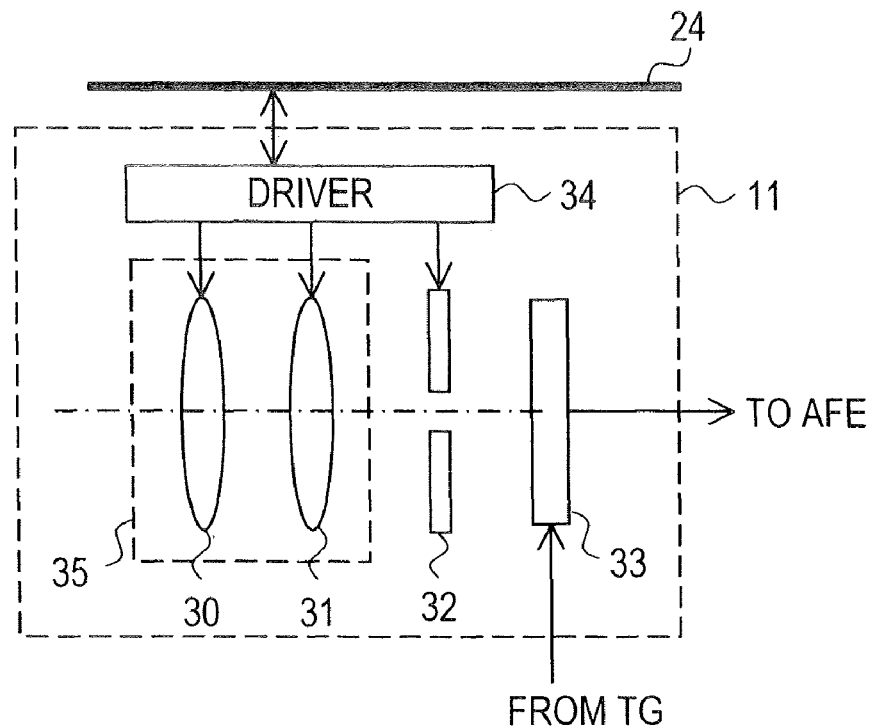
FIG. 2 is an internal block diagram of an image taking section of FIG. 1.

FIG. 2 is an internal configuration diagram of the image-taking apparatus 1 of FIG. 1. A color filter or the like is used for the image taking section 11, thereby forming the image-taking apparatus 1 to be capable of generating a color image through photographing. The image taking section 11 has: an optical system 35 so formed as to include a plurality of lenses including a zoom lens 30 and a focus lens 31; an aperture stop 32; an image sensor 33; and a driver 34. The driver 34 is formed of a motor or the like for achieving movement of the zoom lens 30 and the focus lens 31 and adjustment of the degree of opening of the aperture stop 32.

Light entering from a subject (image-taking target) enters the image sensor 33 via the zoom lens 30 and the focus lens 31 forming the optical system 35, and the aperture stop 32. The TG 22 generates a drive pulse, synchronous with the timing control signal described above, for driving the image sensor 33 and provides it to the image sensor 33.

The image sensor 33 is formed of, for example, CCD (Charge Coupled Device), a CMOS (Complementary Metal Oxide Semiconductor) image sensor, or the like. The image sensor 33 performs photoelectric conversion on an optical image entering therein via the optical system 35 and the aperture stop 32 and outputs an electrical signal obtained through the photoelectric conversion to the AFE 12.

The AFE 12 amplifies an analog signal from the image taking section 11 and converts the amplified analog signal into a digital signal. This digital signal is sequentially transmitted to the video signal processing section 13. The CPU 23 adjusts the degree of signal amplification performed in the AFE 12 based on a signal level of an output signal from the image taking section 11.

Hereinafter, a signal obtained by photographing and outputted from the image taking section 11 or the AFE 12 (signal corresponding to the subject) is called an image-taking signal. The TG 22 generates the vertical synchronizing signal Vsync in a predetermined frame period and obtains one image with an image-taking signal for one frame period. This image represented by the image-taking signal for one frame period is called a photographed image. The frame period is, for example, 1/60 seconds. For each frame appearing in each frame period, one photographed image is obtained.

The video signal processing section 13, based on the image-taking signal from the AFE 12, generates a video signal representing a video (that is, photographed image) obtained by photographing by the image taking section 11, and transmits the generated video signal to the compressing processing section 16. At this point, necessary video processing such as demosaicing processing and edge enhancement processing are also performed. The video signal is composed of a brightness signal Y representing the brightness of the photographed image and color-difference signals U and V representing colors of the photographed image.

The microphone 14 converts a externally provided sound into an analog electric signal and outputs this signal. The sound signal processing section 15 converts the electric signal (sound analog signal) into a digital signal. The digital signal obtained through this conversion is transmitted, as a sound signal representing the sound inputted to the microphone 14, to the compressing processing section 16.

The compressing processing section 16 compresses the video signal from the video signal processing section 13 by using a predetermined compression method. Upon photographing of a moving image or a still image, the compressed video signal is transmitted to the memory card 18. In addition, the compressing processing section 16 compresses the sound signal from the sound signal processing section 15 by using a predetermined compression method. Upon photographing of a moving image, the video signal from the video signal processing section 13 and the sound signal from the sound signal processing section 15 are compressed in such a manner as to be temporally associated with each other and these compressed signals are then transmitted to the memory card 18.

The record button 26a is a push button switch provided for the user to give instructions for starting and ending photographing of a moving image. The shutter bottom 26b is a push button switch provided for the user to give instructions for photographing a still image. In accordance with operation performed on the record bottom 26a, starting and ending of moving-image photographing are performed. In accordance with operation performed on the shutter bottom 26a, still image photographing is performed. A collection of photographed images (stream image) sequentially obtained in frame periods forms a moving image.

Operations modes of the image-taking apparatus 1 include: a photograph mode in which a moving image and a still image can be photographed; and a reproduce mode in which a moving image or a still image stored in the memory card 18 is reproduced for display on the display section 27. In accordance with operation performed on the operation key 26c, transition between the modes occurs.

In the photograph mode, the user presses down the record button 26a, upon which video signals of respective frames and their corresponding sound signals after the press-down operation are sequentially recorded onto the memory card 18 via the compressing processing section 16 under the control of the CPU 23. That is, photographed images of the respective frames, together with the corresponding sound signals, are sequentially stored onto the memory card 18. Once moving-image photographing is started, the moving-image photographing is ended by pressing down the record button 26a again by the user. That is, the recording of the video signals and the sound signals onto the memory card 18 ends, thereby completing photographing of one moving image.

In the photograph mode, the user presses down the shutter bottom 26b, upon which photographing of a still image is performed. Specifically, a video signal of one frame immediately after the shutter bottom 26b is pressed down is recorded, as a video signal representing a still image, onto the memory card 18 via the compressing processing section 16 under the control of the CPU 23. A still image can be photographed simultaneously while a moving image is photographed, in which case an image for the moving image and an image for the still image are generated from an image-taking signal of the same frame.

In the reproduce mode, the user performs predetermined operation on the operation key 26c, upon which a compressed video signal representing a moving image or still image recorded on the memory card 18 is transmitted to the extension processing section 19. The extension processing section 19 extends the video signal received and then transmits it to the video output circuit 20. In the photograph mode, regardless of whether or not a moving image or a still image is being photographed, generation of a video signal by the video signal processing section 13 is typically successively performed and this video signal is transmitted to the video output circuit 20.

The video output circuit 20 converts the provided digital video signal into a video signal (for example, an analog video signal) in a format that permits it to be displayed in the display section 27 and then outputs this video signal. The display section 27 is a display device such as a liquid crystal display or the like, and displays an image in accordance with a video signal outputted from the video output circuit 20. That is, the display section 27 displays an image based on an image-taking signal currently outputted from the image taking section 11 (image representing a current subject), or a moving image or a still image recorded on the memory card 18.

Upon reproduction of a moving image in the reproduce mode, a compressed sound signal corresponding to the moving image recorded on the memory card 18 is also transmitted to the extension processing section 19. The extension processing section 19 extends the received sound signal and transmits it to the sound output circuit 21. The sound output circuit 21 converts the provided digital sound signal into a sound signal (for example, an analog sound signal) in such a format that permits it to be outputted by the speaker 28 and then outputs it to the speaker 28. The speaker 28 outputs the sound signal from the sound output circuit 21 as a sound to the outside.

The CPU 23 moves the zoom lens 30 along the optical axis via the driver 34 of FIG. 2 to thereby change the angle of view for photographing by the image taking section 11 (in other word, enlarges or reduces an image of a subject formed on the image-sensing surface of the image sensor 33). This change in the angle of view is made in accordance with predetermined operation performed on the operation key 26c or automatically as described in the second embodiment to be described later.

[First Embodiment]

Next, a characteristic function of the image-taking apparatus 1 will be described.

This function is called a size adjustment function. First, the first embodiment of the size adjustment function will be described. The size adjustment function is executed in accordance with operation performed on the operation section 26 or the like in the photograph mode.

With the size adjustment function, an entire face or facial parts (eyes, mouth or the like) of a person included in a photographing region are handled as a moving image and they are displayed on the display section 27 on an enlarged scale. At this point, processing such as the one for avoiding a change in the size of a focused specific portion on the display screen is performed as appropriate. The size adjustment function is applied to cases such as where the display section 27 is used as a mirror, and is effective particularly in cases such as where one's face is made up while treating the display section 27 as a mirror.

Figure 3:
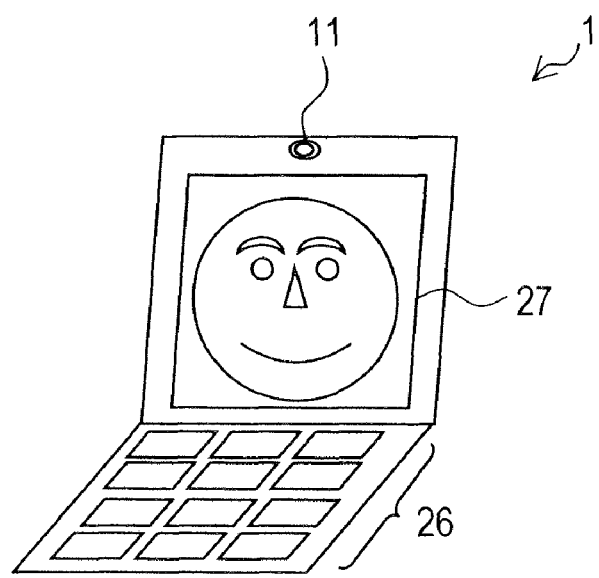
FIG. 3 is a schematic external view of the image-taking apparatus of FIG. 1.

FIG. 3 shows a schematic external view of the image-taking apparatus 1. The arrangement relationship between the display section 27 and the image taking section 11 is adjustable so that a photographer can check contents of display on the display section 27 while photographing himself or herself. In FIG. 3, portions the same as those of FIG. 1 are numbered with the same numerals. FIG. 3 indicates that the image-taking apparatus 1 can also be used as a portable phone, or it can be assumed that the image-taking apparatus 1 is loaded in the portable phone.

Figure 4:
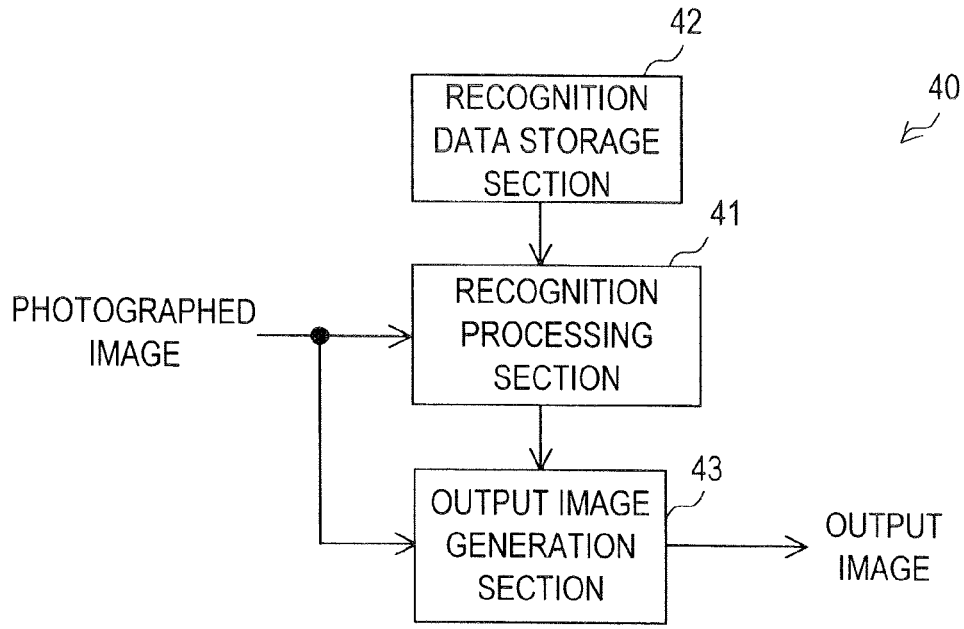
FIG. 4 is a functional block diagram of a subject size adjustment section according to the image-taking apparatus of FIG. 1.

FIG. 4 shows a functional block diagram for achieving the size adjustment function. The size adjustment function is achieved by using: a recognition processing section 41 for recognizing a specific subject included in a photographed image by referring to an image-taking signal; an output image generation section 43 for generating and outputting an output image from the photographed image based on the image-taking signal while referring to results of the recognition by the recognition processing section 41; and a recognition data storage section 42 for storing data used for the recognition processing performed by the recognition processing section 41. A portion composed of these sections is called a subject size adjustment section (image output section) 40. A video signal representing an output image generated in the output image generation section 43 can be recorded onto the memory card 18 (this recording can be omitted).

The recognition processing section 41 is realized mainly by, for example, the video signal processing section 13 and the CPU 23. The recognition data storage section 42 is realized by, for example, a memory provided inside or outside the video signal processing section 13. The output image generation section 43 is realized mainly by, for example, the video signal processing section 13 and the CPU 23.

Figure 5:
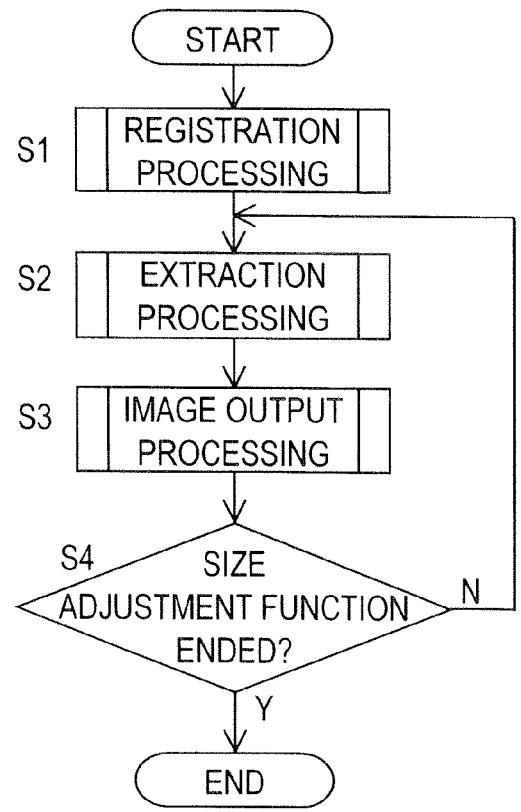
FIG. 5 is a schematic flowchart showing operation of the subject size adjustment section of FIG. 4.

[FIG. 5: Schematic Flowchart]

FIG. 5 is a schematic flowchart representing operation of the subject size adjustment section 40 of FIG. 4. Before execution of the size adjustment function, preparation is made such that the entire face of a subject (person) as a photographer is photographed by the image taking section 11. As shown in FIG. 3, the arrangement relationship between the display section 27 and the image taking section 11 is adjusted so that the subject as the photographer can check contents of display on the display section 27 while photographing himself or herself. This condition is usually kept until when the execution of size adjustment function ends.

When the size adjustment function is enabled in accordance with operation performed on the operation key 26c of FIG. 1 or the like, registration processing is performed first in step S1. In step S1, the registration processing such as processing related to a specific portion (eyes or the like) to be displayed on an enlarged scale is performed.

Upon ending of step S1, the operation proceeds to step S2. In step S2, extraction processing is performed for extracting the specific portion from photographed images obtained in step S1 and thereafter. In step S3 following step S2, image output processing is performed for outputting an image including the specific portion. Upon ending of step S3, the operation proceeds to step S4, in which it is confirmed whether or not instructions for ending the execution of the size adjustment function has been given by operation performed on the operation key 26c or the like. If the instructions for ending the execution of the size adjustment function have been given (Y in step S4), the operation of the size adjustment function ends. If the instructions have not been given (N in step S4), the operation returns to step S2, repeating loop processing of steps S2 and S3. This loop processing is executed, for example, once for one frame.

[Registration Processing]

Figure 6:
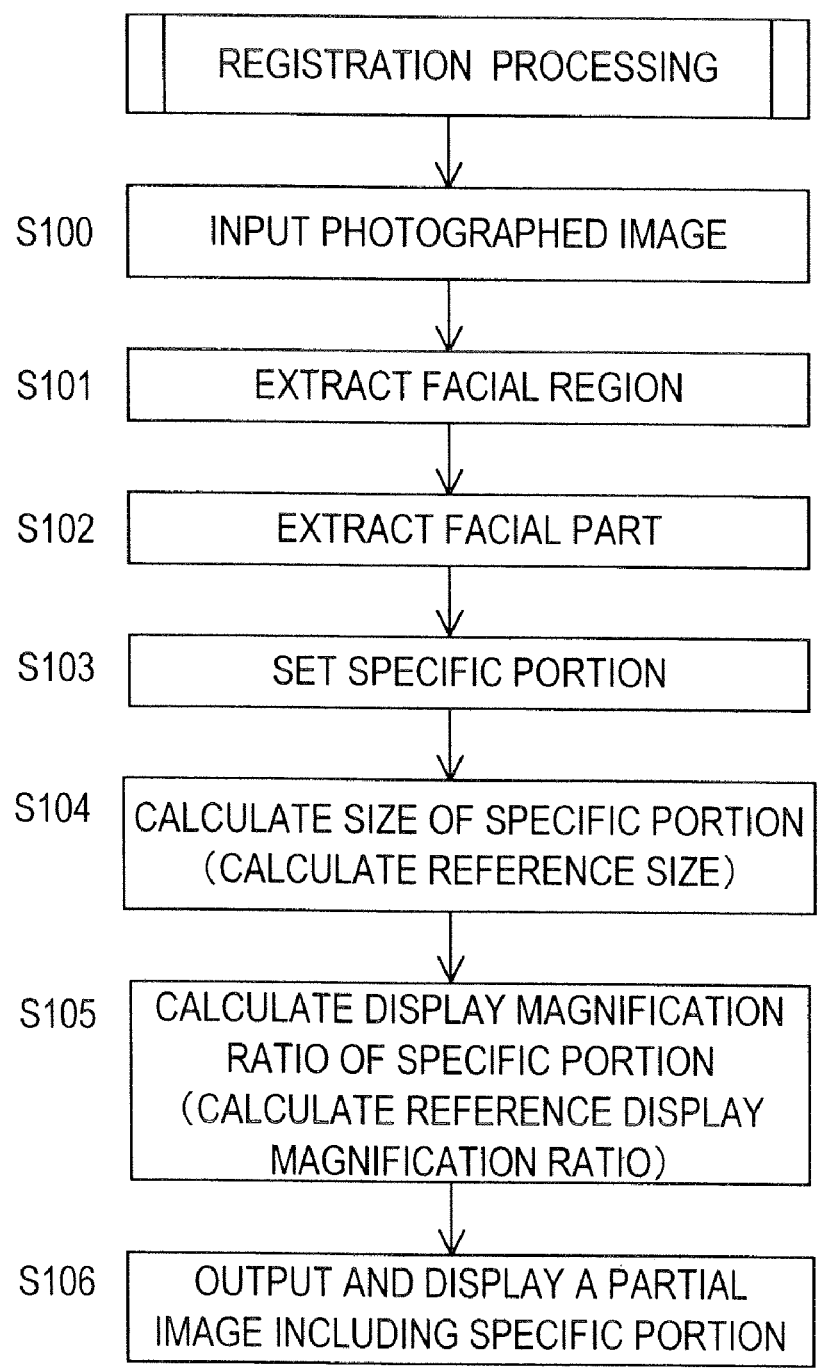
FIG. 6 is a detailed flowchart showing operation of registration processing of FIG. 5.

FIG. 6 is a detailed flowchart showing a flow of detailed operation of the registration processing executed in step S1 of FIG. 5. Step S1 of FIG. 5 includes steps S100 to S106. Upon ending of step S106, transition to step S2 of FIG. 5 occurs.

Upon transition to step S1, processing of step S100 is executed. The processing of step S100 is executed, for example, when the shutter bottom 26b is pressed down after the execution of the size adjustment function has been started. In step S100, a photographed image based on an image-taking signal of a current frame is inputted to the subject size adjustment section 40 of FIG. 4. In this photographed image, a subject (entire face) as a photographer is included.

Subsequently, in step S101, a facial region of the subject included in the photographed image inputted in step S100 is extracted and recognized.

Specifically, for example, the recognition processing section 41 recognizes and extracts the facial region included in the photographed image by pattern matching between a face pattern included in a face dictionary stored in the recognition data storage section 42 of FIG. 4 and the photographed image including the facial region. The face dictionary previously stores a plurality of face patterns representing the face as an image as viewed from the front. The face dictionary is previously created by learning images of a plurality of faces as viewed from the front. The pattern matching is well-known technology, and thus its detailed description is omitted here.

It is also possible to use a different arbitrary method as a method of extracting and recognizing the facial region. For example, the facial region may be extracted by extracting a region classified as a skin color, or the facial region may be recognized by extracting the contour of the face of a person from the photographed image.

In step S102 following step S101, facial parts in the facial region extracted in step S101 are extracted and recognized. The facial parts are facial components including eyes, a nose, eyebrows, lips, a cheek, and the like. The lips may be treated as the mouth.

Specifically, for example, through pattern matching between the facial part pattern included in the facial part dictionary stored in the recognition data storage section 42 of FIG. 4 and the photographed image including the facial region and the facial parts, the recognition processing section 41 recognizes and extracts the facial parts (for example, left eye, right eye, nose, eyebrows, lips, and cheek) included in the photographed image. When the facial part is lips, a plurality of facial part patterns (lip patterns) expressing lips as an image are previously stored as data in the facial part dictionary. The facial part dictionary is previously created by learning a plurality of lip images. The same applies to the facial parts other than the lips.

It is also possible to use a different arbitrary method as a method of extracting and recognizing the facial parts. For example, the eyes, eyebrows, lips, and the like can be extracted with relative ease by using color information of an image-taking signal, considering the positional relationship between these parts and the facial region.

In step S103 following step S102, the specific portion to be displayed on an enlarged scale in the display section 27 is set. The specific portion is an entire facial region or any of facial parts which can be extracted and recognized in step S102. The specific portion set here is hereinafter called a specific portion α (specific subject). The specific portion α is set, for example, in accordance with operation performed on the operation key 26c or the like. Or, making the display section 27 function as a touch panel, the specific portion α may be set in accordance with operation performed on this touch panel. For example, when a portion displaying the left eye is touched, the left eye is set as the specific portion α.

The processing of step S103 may be executed before steps S101 and S102.

In step S104 following step S103, the output image generation section 43 of FIG. 4 calculates the size of the specific portion α. The size of the specific portion α calculated in step S104 is referenced as a reference size in other processing.

If the specific portion α is the entire facial region, the size of this facial region (that is, size of the specific portion α) is calculated based on information specifying the position, in the photographed image, of the facial region extracted in step S101. If the specific portion α is any of the facial parts, the size of this facial part (that is, size of the specific portion α) is calculated based on information specifying the position, in the photographed image, of the facial part extracted in step S102.

Figure 7:
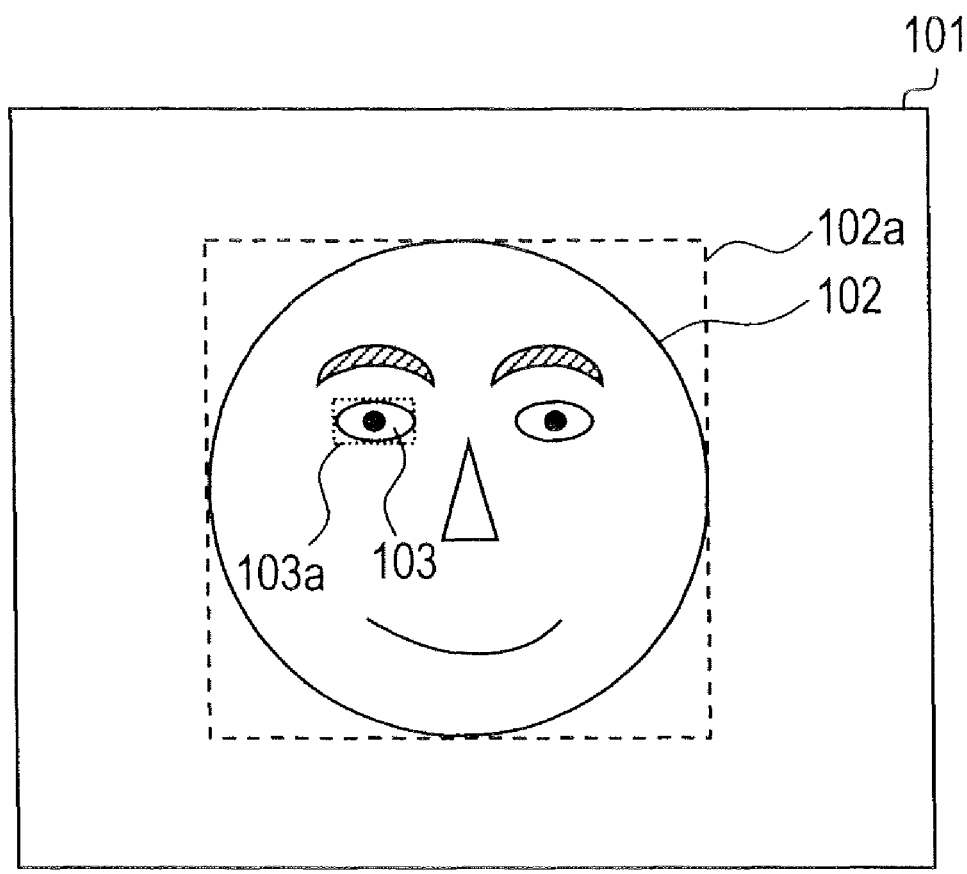
FIG. 7 is a diagram for explaining the operation of registration processing of FIG. 6 showing a photographed image taken by the image taking section of FIG. 1.

Now, assume, for example, a case where a photographed image shown in FIG. 7 is obtained. In FIG. 7, an area within a square box numbered with numeral 101 represents an entire image of the photographed image. Numeral 102 represents an extracted facial region, and numeral 103 represents a left eye region as one facial part extracted. Numeral 102a represents a rectangle circumscribed about the facial region 102, that is, a smallest rectangle surrounding the facial region 102. Numeral 103a represents a rectangle circumscribed about the left eye region 103, that is, a smallest rectangle surrounding the left eye region 103. For simplified illustration purposes, in the drawings such as FIG. 7 representing the face or facial parts of the person, portions not related to the face are omitted from illustration, and the left side on the paper surface corresponds to the left side of the face.

Then, if the specific portion α is the entire facial region, the size of the rectangle 102a is defined as the size of the specific portion α. If the specific portion α is the left eye, the size of the rectangle 103a is defined as the size of the specific portion α. The size of the rectangle 102a (or rectangle 103a) is expressed by the number (total number) of pixels forming the rectangle 102a (or rectangle 103a) in the photographed image.

In step S105 following step S104, the output image generation section 43 of FIG. 4 calculates the display magnification ratio of the specific portion α, when displayed on the display screen of the display section 27 based on the display screen size of the display section 27 of FIG. 1 and the size of the specific portion α calculated in step S104. The display magnification ratio calculated in step S105 is referenced as a reference display magnification ratio in other processing.

Then, in step S106, the output image generation section 43 outputs as an output image of the subject size adjustment section 40 an image including the specific portion α with its image size adjusted in accordance with the display magnification ratio. A video signal representing this output image is provided to the display section 27 via the video output circuit 20 and the output image is displayed on the display screen of the display section 27.

Figure 8A:
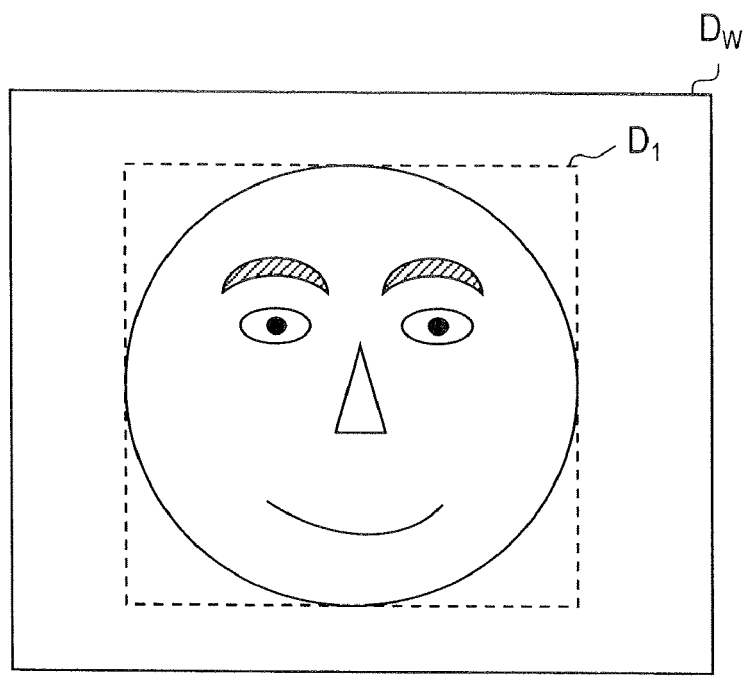
FIGS. 8A and 8B are diagrams for explaining the operation of registration processing of FIG. 6 showing images displayed in a display section of FIG. 1.
Figure 8B:
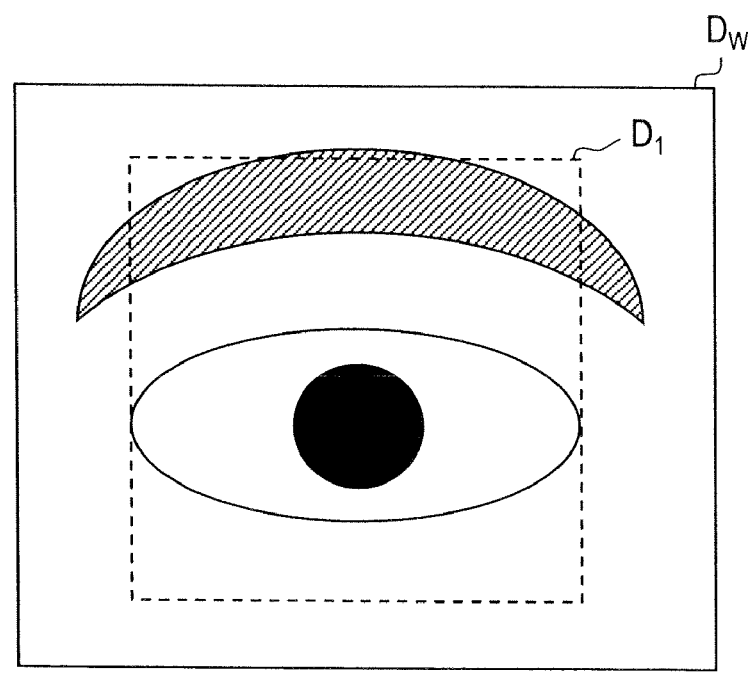
Figure 9:
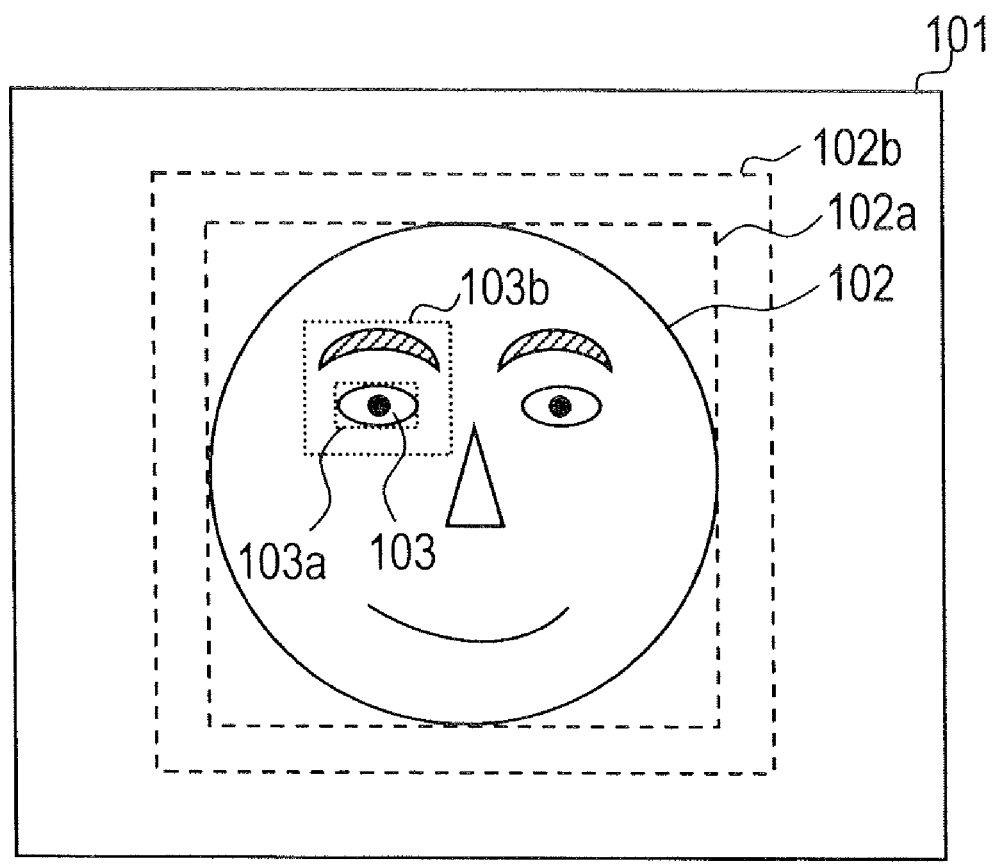
FIG. 9 is a diagram for explaining the operation of registration processing of FIG. 6 showing the photographed image taken by the image taking section of FIG. 1.

Referring to FIGS. 8A, 8B, and 9, additional description concerning contents of the processing of steps S105 and S106 will be given. In FIGS. 8A and 8B, $D_w$ represents an entire region of the display screen of the display section 27, and $D_l$ represents a partial region of the display screen which is located near the center of the entire region $D_w$. In FIG. 9, portions the same as those in FIG. 7 are numbered with the same numerals.

If the specific portion α is the entire facial region corresponding to numeral 102 of FIG. 9, the processing of step S106 provides a display on the display screen with contents as shown in FIG. 8A. That is, the display magnification ratio is set such that an image within a rectangle 102a in a photographed image of FIG. 9 is displayed by using the entire partial region $D_l$. Details of processing performed in this case are as follows. The output image generation section 43 of FIG. 4 cuts out from an entire image 101 of the photographed image a partial image 102b (including the rectangle 102a) of FIG. 9 having an image size in accordance with the set display magnification ratio, and enlarges this partial image 102b in accordance with the display magnification ratio to generate an output image. As a result, the partial image 102b is displayed by using the entire region $D_w$ of the display screen.

If the specific portion α is the left eye corresponding to numeral 103 of FIG. 9, the processing of step S106 provides contents of display on the display screen as shown in FIG. 8B. That is, the display magnification ratio is set such that an image within the rectangle 103a in the photographed image of FIG. 9 is displayed by using the entire partial region $D_l$. Details of the processing performed in this case are as follows. The output image generation section 43 of FIG. 4 cuts out from the entire image 101 of the photographed image a partial image 103b (including the rectangle 103a) of FIG. 9 having an image size in accordance with the set display magnification ratio, and enlarges this partial image 103b in accordance with the display magnification ratio to generate an output image. As a result, the partial image 103b is displayed by using the entire region $D_w$ of the display screen.

For a certain image, an increase in the display magnification ratio accompanies an increase in the display size of this image on the display screen. The horizontal-to-vertical ratio of the cut partial image 102b or 103b is, for example, equal to the horizontal-to-vertical ratio of the entire image 101 of the photographed image.

[Extraction Processing]

Figure 10:
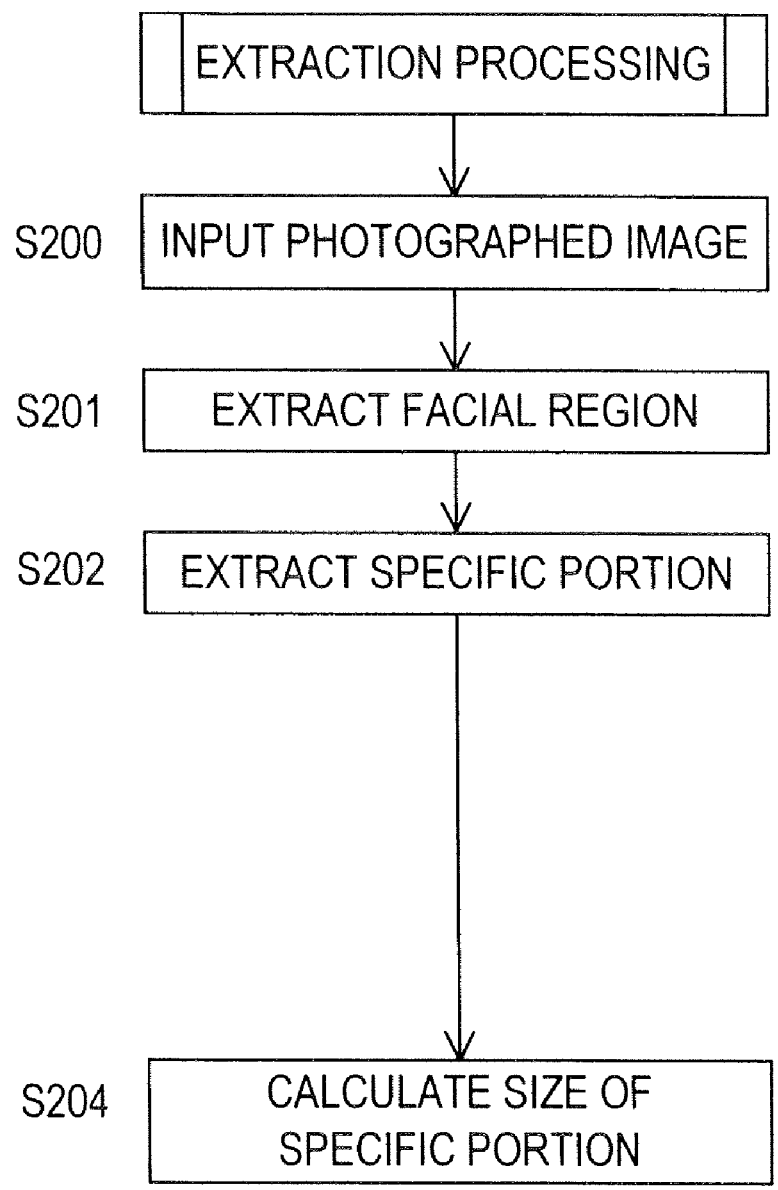
FIG. 10 is a detained flowchart showing operation of extraction processing of FIG. 5.

FIG. 10 is a detailed flowchart showing a flow of detailed operation of the extraction processing executed in step S2 of FIG. 5. The processing of step S2 is mainly executed by the recognition processing section 41 of FIG. 4. However, note that the processing of step S204 is executed by the output image generation section 43. The step S2 of FIG. 5 includes steps S200 to S202 and S204. Upon ending of the processing of step S204, the operation proceeds to step S3 of FIG. 5.

Upon transition to step S2, the processing of step S200 is executed. In step S200, the photographed image based on the image-taking signal of the current frame is inputted to the subject size adjustment section 40 of FIG. 4. In this photographed image, the subject as the photographer is included.

Subsequently, in step S201, using the same processing as the processing in step S101 of FIG. 6, the facial region of the subject included in the photographed image inputted in step S200 is extracted and recognized.

Subsequently, in step S202, the specific portion α is extracted from the photographed image inputted in step S200 and then recognized. If the specific portion α is the entire facial region, the extraction of the specific portion α is completed by the processing of step S201. If the specific portion α is the facial part, the specific portion α is extracted by using the same processing as the processing in step S102 of FIG. 6.

Upon ending of the processing of step S202, the operation proceeds to step S204. In step S204, the size of the specific portion α extracted in step S202 is calculated by using the same processing as the processing in step S104 of FIG. 6. This size is the size in the photographed image as described in step S104.

[Image Output Processing]

Figure 11:
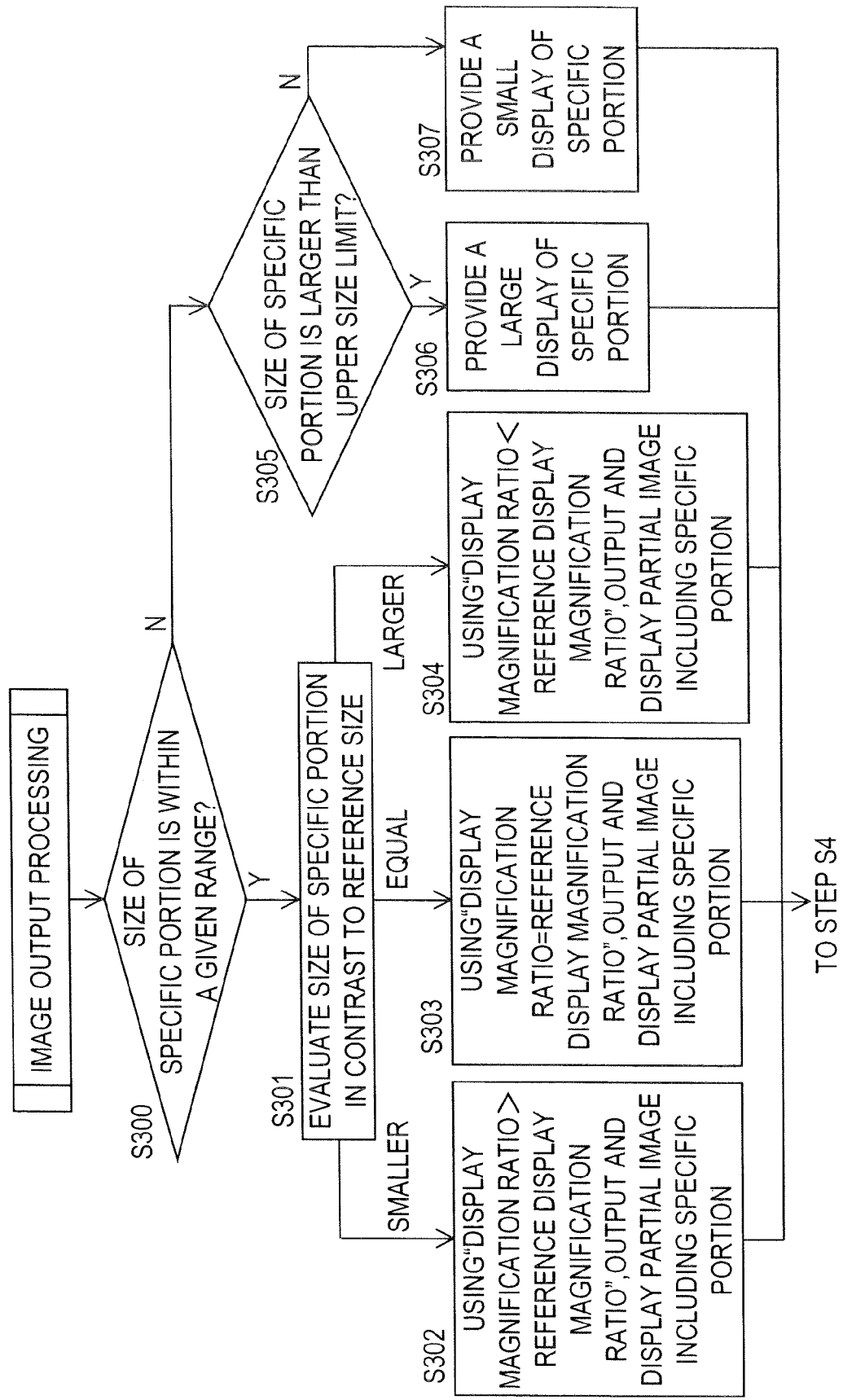
FIG. 11 is a detailed flowchart showing operation of image output processing of FIG. 5.

FIG. 11 is a detailed flowchart showing a flow of detailed operation of the image output processing executed in step S3 of FIG. 5. The processing of step S3 is executed by the output image generation section 43. Step S3 of FIG. 5 includes steps S300 to S307.

Upon transition to step S3, the processing of step S300 is executed first. In step S300, it is judged whether or not the size (this size is defined as $A_s$) of the specific portion α calculated by the immediately preceding processing in step S204 is within a given range. Specifically, it is judged whether or not formula (1) below is satisfied:

$$A_{REF} + \Delta A_1 \geq A_s a \geq A_{REF} - \Delta A_2 \quad (1).$$

Here, $A_{REF}$ represents the reference size of the specific portion α calculated in step S104 of FIG. 6, and $\Delta A_1$ and $\Delta A_2$ have positive values. Therefore, $(A_{REF} + \Delta A_1)$ represents the upper size limit larger than the reference size and $(A_{REF} - \Delta A_2)$ represents the lower size limit smaller than the reference size.

In step S300, if the formula (1) is satisfied, the operation proceeds to step S301, in which a size $A_s$ relative to the reference size $A_{REF}$ is evaluated.

If the size $A_s$ is equal (or substantially equal) to the reference size $A_{REF}$, the operation proceeds to step S303, in which the reference display magnification ratio calculated in step S105 of FIG. 6 is calculated as a display magnification ratio. Then, the output image generation section 43 outputs as an output image an image obtained by enlarging a partial image including the specific portion α in the latest photographed image in accordance with the aforementioned display magnification ratio (equal to the reference display magnification ratio). As a result, the size (dimension) of the specific portion α on the display screen becomes equivalent to that on the display in step S106 of FIG. 6. The output image in this case is obtained by enlarging with the reference display magnification ratio a partial image (cut image) whose image size is equal to that of the partial image (102*b*, 103*b*, or the like) cut out in step S106.

If the size $A_s$ is smaller than the reference size $A_{REF}$, the operation proceeds to step S302, in which a display magnification ratio larger than the reference display magnification ratio is calculated so that the size (dimension) of the specific portion α on the display screen becomes equivalent to that on the display in step S106 of FIG. 6. Then, the output image generation section 43 outputs as an output image an image obtained by enlarging a partial image including the specific portion α in the latest photographed image in accordance with the aforementioned display magnification ratio (larger than the reference display magnification ratio). As a result, the size (dimension) of the specific portion α on the display screen becomes equivalent to that on the display in step S106 of FIG. 6. The output image in this case is obtained by enlarging with the display magnification ratio larger than the reference display magnification ratio a partial image (cut image) whose image size is smaller than that of the partial image (102*b*, 103*b*, or the like) cut out in step S106.

If the size $A_s$ is larger than the reference size $A_{REF}$, the operation proceeds to step S304, in which a display magnification ratio smaller than the reference display magnification ratio is calculated so that the size (dimension) of the specific portion α on the display screen becomes equivalent to that on the display in step S106 of FIG. 6. Then, the output image generation section 43 outputs as an output image an image obtained by enlarging a partial image including the specific portion α in the latest photographed image in accordance with the aforementioned display magnification ratio (smaller than the reference display magnification ratio). As a result, the size (dimension) of the specific portion α on the display screen becomes equivalent to that on the display in step S106 of FIG. 6. The output image in this case is obtained by enlarging with the display magnification ratio smaller than the reference display magnification ratio a partial image (cut image) whose image size is larger than that of the partial image (102*b*, 103*b*, or the like) cut out in step S106.

Figure 12:
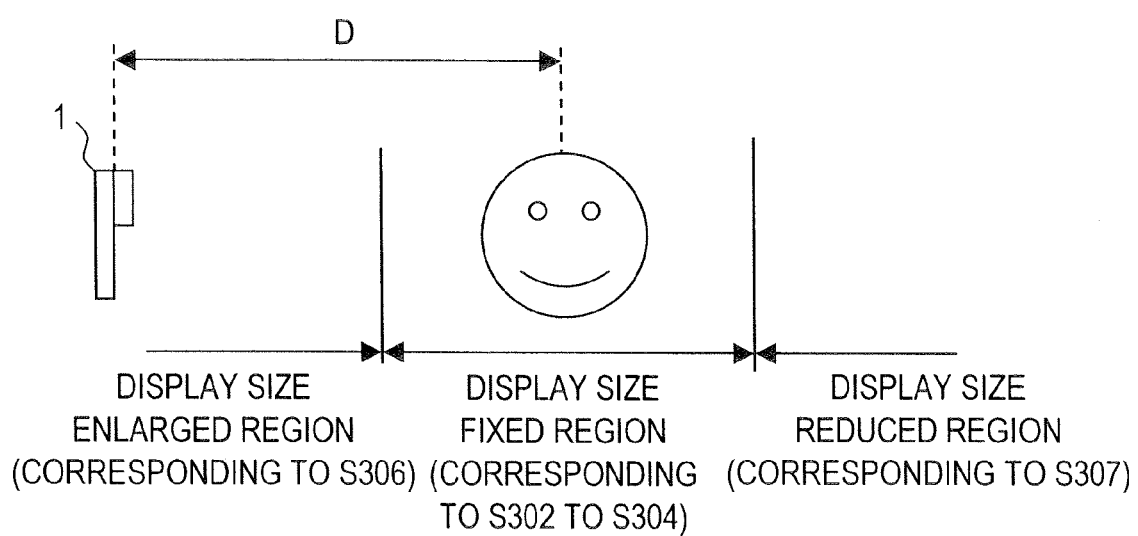
FIG. 12 is a diagram showing positional relationship in actual space between the image-taking apparatus of FIG. 1 and a subject.

With a fixed angle of view for photographing by the image-taking apparatus 1, a change in a distance D in an actual space between the person captured in the photographed image and the image-taking apparatus 1 (image taking section 11) changes the dimension (size) of the facial region and facial parts of this person in the photographed image (see FIG. 12). Therefore, if the display magnification ratio is fixed, a change in the distance D changes the dimension of the specific portion α on the display screen, which causes inconvenience in, for example, making up one's face by referring to the display screen, or the like. However, execution of processing (change reduction processing) including steps S301 to 304 of FIG. 11 keeps the dimension (size) of the specific portion α on the display screen substantially constant even when the distance D changes due to shake of the subject or the like, which permits smoothly making up one's face by referring to the display screen. The shake of the subject is, for example, shake of hands holding the image-taking apparatus 1, shake of the face, swing of the body, or the like.

In step S300, if the formula (1) above is not satisfied, the operation proceeds to step S305, in which it is judged whether or not the size $A_s$ is larger than the upper size limit $(A_{REF} + \Delta A_1)$. The size $A_s$ is the size of the specific portion α in the photographed image; therefore the size $A_s$ increases as the person as the subject approaches the image-taking apparatus 1 (that is, as the distance D becomes shorter) and decreases as she moves away from the image-taking apparatus 1 (that is, as the distance D becomes longer).

If the size $A_s$ is larger than the upper size limit $(A_{REF} + \Delta A_1)$, the operation proceeds to step S306, in which the display magnification ratio is calculated so that the size (dimension) of the specific portion α on the display screen becomes larger than that on the display in step S106 of FIG. 6. For example, assume that this display magnification ratio is equal to or larger than the reference display magnification ratio. Then, the output image generation section 43 outputs as an output image an image obtained by enlarging a partial image including the specific portion α in accordance with the aforementioned display magnification ratio.

Figure 13A:
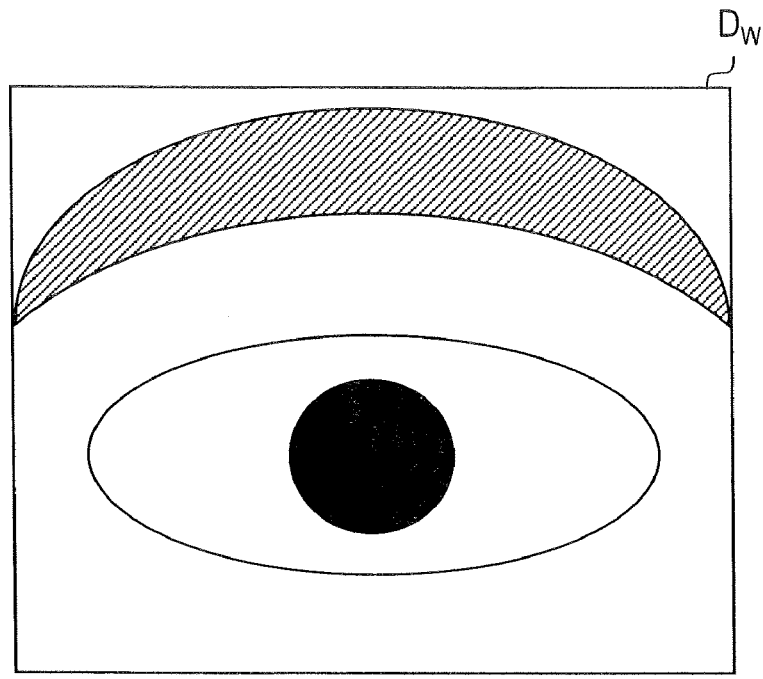
FIGS. 13A and 13B are diagrams showing examples of a display screen displayed by executing the image output processing of FIG. 11.

When the operation reaches step S306, the distance D is shorter and thus the size $A_s$ of the specific portion α in the photographed image is larger. Thus, even by use of, for example, the reference display magnification ratio, the size of the specific portion α on the display screen becomes larger than that on the display (see FIG. 8B) in step S106 of FIG. 6, as shown in FIG. 13A.

If the size $A_s$ is smaller than the upper size limit ($A_{REF}+\Delta A_1$), the operation proceeds to step S307. Considering also results of the judgment in step S300, the operation proceeds to step S307 if the size $A_s$ is smaller than the lower size limit ($A_{REF}-\Delta A_2$). In step S307, the display magnification ratio is calculated so that the size (dimension) of the specific portion α on the display screen becomes smaller than that on the display in step S106 of FIG. 6. For example, assume that this display magnification ratio is equal to or smaller than the reference display magnification ratio. Then, the output image generation section 43 outputs as an output image an image obtained by enlarging a partial image including the specific portion α in accordance with the aforementioned display magnification ratio.

Figure 13B:
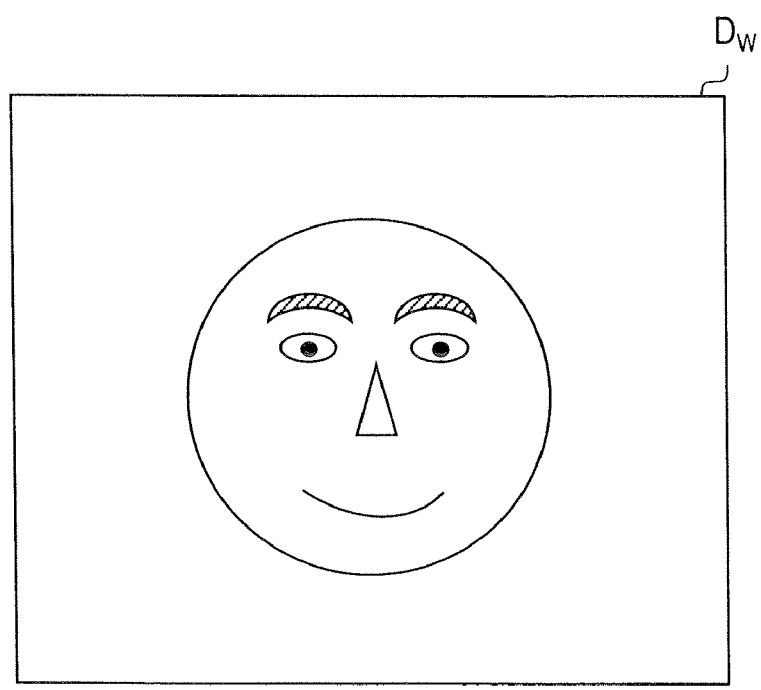

When the operation reaches step S307, the distance D is longer and thus the size $A_s$ of the specific portion α in the photographed image is smaller. Thus, even by use of, for example, the reference display magnification ratio, the size of the specific portion α on the display screen is smaller than that on the display (see FIG. 8B) in step S106 of FIG. 6, as shown in FIG. 13B. FIGS. 13A and 13B show examples of the display screen when the specific portion α is a left eye. FIG. 13B shows a case where the entire facial region is displayed due to a small display magnification ratio. In step S307, the entire photographed image may be displayed on the display screen of the display section 27.

Upon ending of the processing of any of steps S302, S303, S304, S306, and S307, the image output processing of step S3 is ended, and the operation proceeds to step S4 of FIG. 5. FIG. 12 shows general contents of the image output processing of step S3 in relation to the distance D.

The processing (change reduction processing) including steps S301 to 304 reduces change in the dimension of the specific portion α on the display screen with respect to some degree of change in the distance D, thus providing the advantage as described above. However, in cases such as where special focus is to be put on the specific portion α during viewing, the person as the subject usually approaches her face closer to the display section 27 considered as the mirror. In such a case, the processing of step S306 is executed, whereby the specific portion α is displayed on an enlarged scale size as in FIG. 13A. That is, a display satisfying the user intent is provided.

On the other hand, when the person as the subject wants to check the entire face while, for example, making up the surrounding of her eyes, she usually moves her face away from the display section 27 considered as the mirror. In such a case, the processing of step S307 is executed, whereby an image of a relatively large actual space region including the specific portion α is displayed, as shown in FIG. 13B. That is, a display satisfying the user intent is provided.

[Modified Example of Branch Judgement]

The image output processing described above corresponding to FIG. 11 performs branch judgment on the generation of an output image by evaluating the size of the specific portion α. Alternatively, this branch judgment may be performed by evaluating the size of a portion different from the specific portion α. Such branch judgment will be described as a modified example of branch judgment.

A portion different from the specific portion α is hereinafter referred to as a related portion β (related subject). The related portion β is, as is the case with the specific portion α, an entire facial region or any of facial parts that can be extracted and recognized in steps S102 and S202 (see FIGS. 6 and 10). For example, if the specific portion α is a left eye, the related portion β is the entire facial region or any of the facial parts other than the left eye.

When the modified example of branch judgment is adopted, in step S104 of FIG. 6, the size of the related portion β in the photographed image obtained in step S100 is calculated as a reference size $B_{REF}$, and also in step S204 of FIG. 10, the size of the related portion β in the photographed image obtained in step S200 is calculated as a size $B_s$. A method of calculating the size of the related portion β is the same as the method of calculating the size of the specific portion α.

Then, in this case, in step S300, it is judged whether or not formula (2) below is satisfied:

$$B_{REF}+\Delta B_1 \geq B_S \geq B_{REF}-\Delta B_2 \qquad (2),$$

where $\Delta B_1$ and $\Delta B_2$ have positive values.

If the formula (2) is satisfied, the processing of step S303 is executed if the size $B_s$ is equal (or substantially equal) to the reference size $B_{REF}$, the processing of step S302 is executed if the size $B_s$ is smaller than the reference size $B_{REF}$, and the processing of step S304 is executed if the size $B_s$ is larger than the reference size $B_{REF}$. If the formula (2) is not satisfied, the processing of step S306 is executed if the size $B_s$ is larger than the upper size limit ($B_{REF}+\Delta B_1$) and the processing of step S307 is executed if the size $B_s$ is not larger than the upper size limit ($B_{REF}+\Delta B_1$).

The related portion β, needless to say, moves relative to the movement of the specific portion α both in an actual space and in the photographed image. When the size of the specific portion α in the photographed image decreases as a result of an increase in the distance D, the size of the related portion P in the photographed image also decreases relative to this decrease. When the size of the specific portion α in the photographed image increases as a result of a decrease in the distance D, the size of the related portion β in the photographed image also increases relative to this increase. Therefore, performing the processing as in the modified example of branch judgment can provide the same effect as described above.

Next, as other processing examples of the image output processing of step S3 of FIG. 5, a first, a second, and a third modified processing examples will be described. The first, second, and third modified processing examples can be performed instead of the processing shown in FIG. 11. To each of the first, second, and third modified examples, the modified example of branch judgment described above is applicable. The first, second, and third modified processing example are executed by the output image generation section 43 of FIG. 4, upon which results of recognition by the recognition processing section 41 of FIG. 4 are referenced.

[First Modified Processing Example]

First, the first modified processing example will be described. In the first modified processing example, based on the state of change in the size (dimension) of the specific portion α in the photographed image or based on the state of change in the size (dimension) of the related portion β in the photographed image, it is judged whether or not processing (change reduction processing) such as one corresponding to steps S301 to S304 of FIG. 11 can be executed. This judgment may be performed based on either of the changes since the size of the specific portion α and the size of the related portion P change in the photographed image in the same manner.

For simplified description purposes, the first modified processing example will be described below focusing on, of the specific portion α and the related portion β, the specific portion α. To perform the first modified processing example by using the related portion β, for necessary portions only, the specific portion α, the size $A_s$, and the reference size $A_{REF}$ can be read as the related portion β, the size $B_s$, and the reference size $B_{REF}$.

Figure 14A:
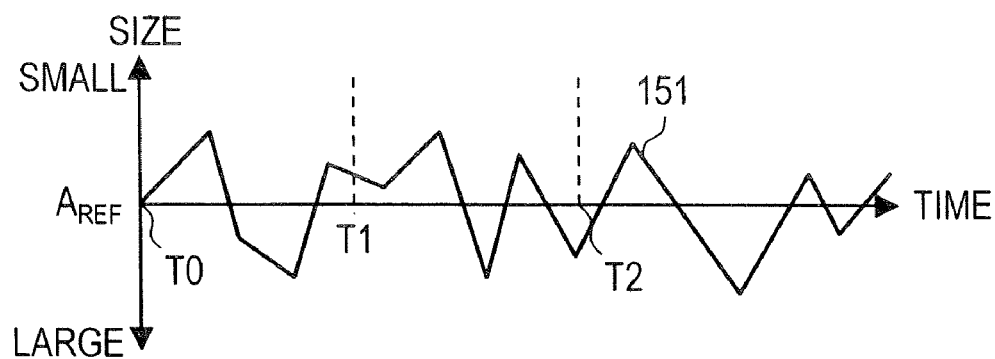
FIGS. 14A and 14B are diagrams for explaining a first modified processing example as a modified example of the image output processing of FIG. 5.
Figure 14B:
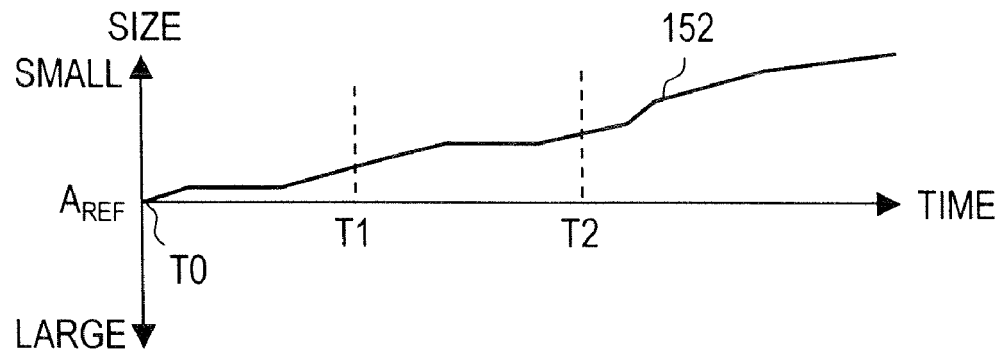

In FIGS. 14A and 14B, broken lines 151 and 152 represent time change in the size $A_s$ of the specific portion α calculated by the extraction processing of step S2. In each of FIGS. 14A and 14B, the horizontal axis represents time and the vertical axis represents the size $A_s$ calculated. The upward direction of the vertical axis corresponds to the direction in which the size $A_s$ decreases. In each of FIGS. 14A and 14B, timing T0 is timing at which the processing of step S1 of FIG. 5 is executed, timing T1 is timing at which the processing of step S2 of FIG. 5 is executed, and timing T2 is timing at which the processing of step S2 of FIG. 5 is executed after the timing T1.

Figure 15:
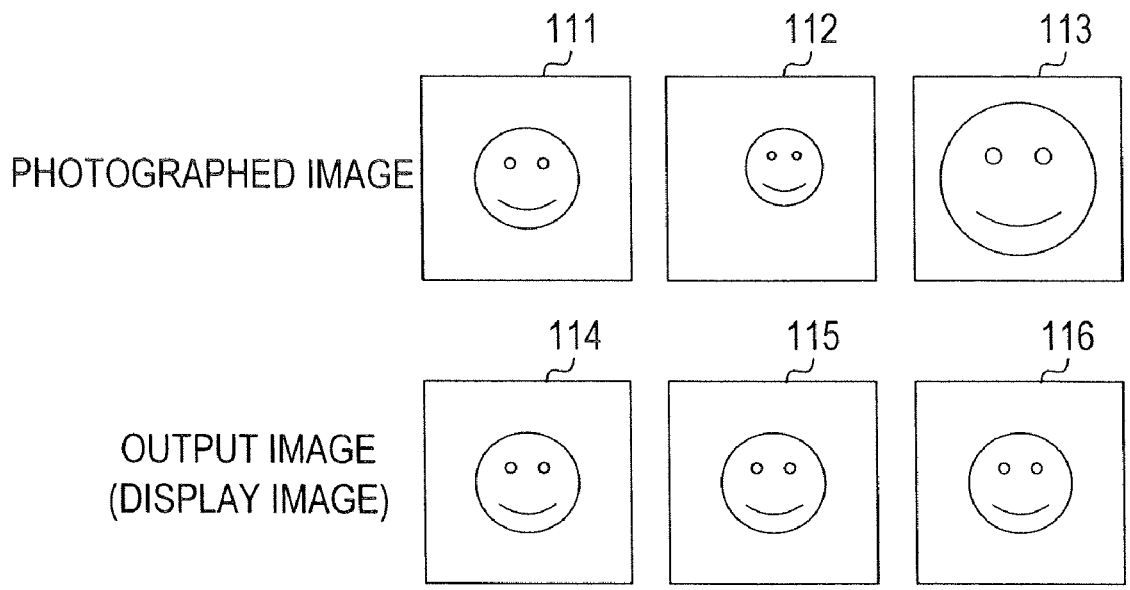
FIG. 15 is a diagram showing relationship between photographed images and output images (displayed images) when the first modified processing example as the modified example of the image output processing of FIG. 5 is executed.
Figure 16:
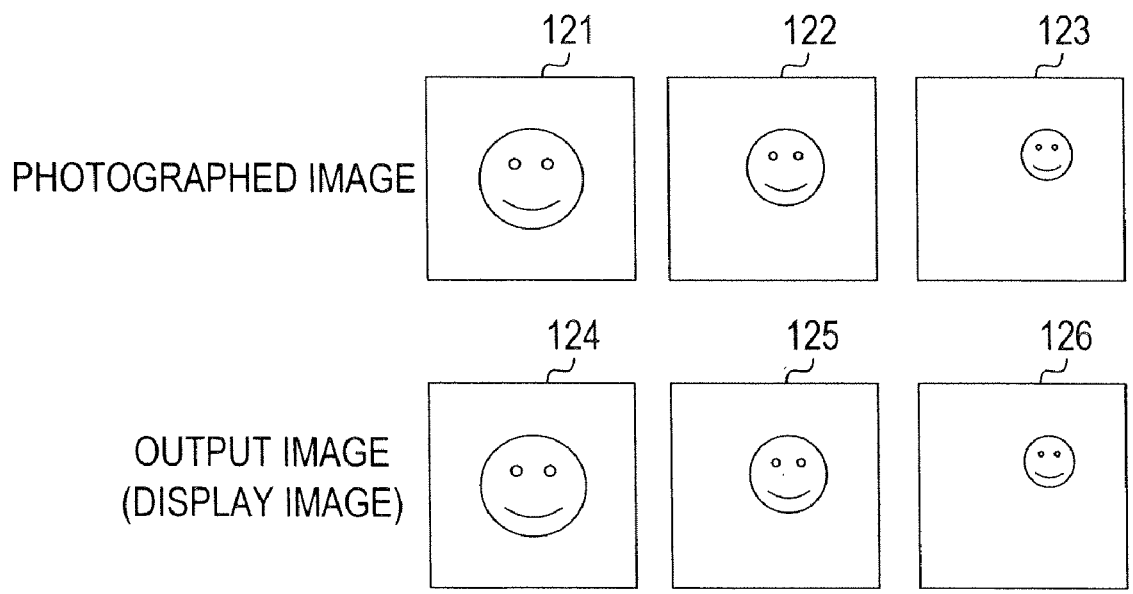
FIG. 16 is a diagram showing relationship between photographed images and output images (displayed images) when the first modified processing example as the modified example of the image output processing of FIG. 5 is executed.

As shown by the broken line 151 of FIG. 14A, when the size $A_s$ becomes smaller and larger relative to the reference size $A_{REF}$, it is assumed that the change in the size $A_s$ is attributable to shake of the subject. In such a case, as described above, it is convenient to keep the display size of the specific portion α constant. Thus, in such a case, the processing of steps S301 to 304 of FIG. 11 is executed. FIG. 15 shows photographed images and output images (display images) corresponding to FIG. 14A. The photographed images 111, 112, and 113 are images photographed at the timing T0, T1, and T2, respectively. The output images 114, 115, and 116 are images outputted at the timing T0, T1, and T2, respectively (that is, images displayed on the display section 27). FIG. 15 and FIG. 16 to be described later refer to an example where the specific portion α is the entire facial region.

On the other hand, as shown by the broken line 152 of FIG. 14B, when the size $A_s$ changes in one direction (direction in which it becomes larger or smaller), it is assumed that the person as the subject moves in the direction corresponding to this change. In such a case, as described above, providing a display in accordance with this movement more satisfies the subject's intent. Thus, in such a case, display in accordance with this movement is performed without executing the processing of steps S301 to 304 of FIG. 11. FIG. 16 shows photographed images and output images (display images) corresponding to FIG. 14B. The photographed images 121, 122, and 123 are image photographed at timing T0, T1, and T2, respectively. The output images 124, 125, and 126 are images outputted at the timing T0, T1, and T2, respectively (that is, images displayed on the display section 27).

Specifically, to realize the assumption described above, a required number of the sizes $A_s$ calculated in the processing of step S2 are stored. Then, the size $A_s$ calculated for the current frame and the sizes $A_s$ for (n−1) frames in the past with reference to the current frame are referenced (where n is an integer number). That is, the n-number of sizes $A_s$ including the latest size $A_s$ are referenced. Then, when the sizes larger than the reference size $A_{REF}$ and the sizes smaller than the reference size $A_{REF}$ are mixed in this n-number of sizes $A_s$, the processing of steps S301 to S304 of FIG. 11 is executed.

On the other hand, when the sizes larger than the reference size $A_{REF}$ and the sizes smaller than the reference size $A_{REF}$ are not mixed in this n-number of sizes $A_s$ but when the size $A_s$ changes in one direction with time, the processing of steps S301 to S304 of FIG. 11 is not executed but an output image is generated such that the size of the specific portion α on the display screen changes in accordance with the change in the size $A_s$ of the specific portion α in the photographed image (for example, the processing of step S306 or 307 of FIG. 11 may be executed).

If the first modified processing example is adopted, shake or the like not intended by the subject and movement intended by the subject can be discriminated from each other, thus providing an appropriate display in accordance with results of this discrimination.

[Second Modified Processing Example]

Next, the second modified processing example will be described. Also in the second modified processing example, as in the first modified processing example, based on the state of change in the size (dimension) of the specific portion α in the photographed image or based on the state of change in the size (dimension) of the related portion β in the photographed image, it is judged whether or not processing (change reduction processing) such as one corresponding to steps S301 to S304 of FIG. 11 can be executed. In the second modified processing example, the amount of change in the size is referenced.

For simplified description purposes, the second modified processing example will be described below focusing on, of the both specific portion α and related portion β, the specific portion α. To perform the second modified processing example by using the related portion β, for necessary portions, the specific portion α, the size $A_s$, and the reference size $A_{REF}$ can be read as the related portion β, the size $B_s$, and the reference size $B_{REF}$.

Figure 17A:
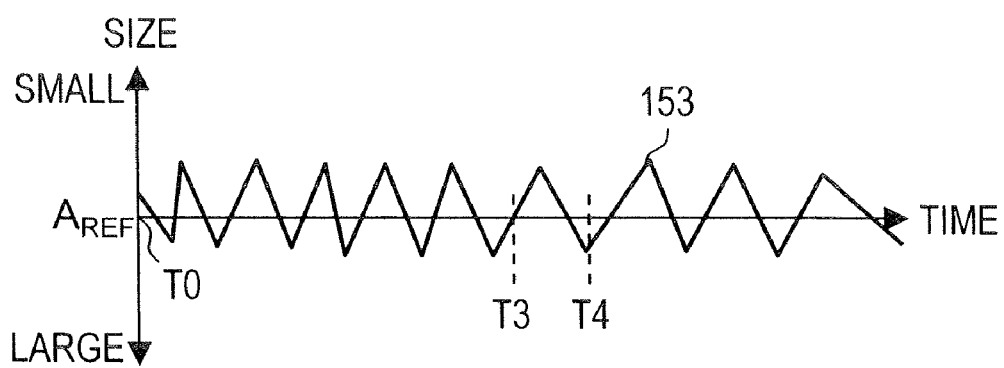
FIGS. 17A and 17B are diagrams for explaining a second modified processing example as a modified example of the image output processing of FIG. 5.
Figure 17B:
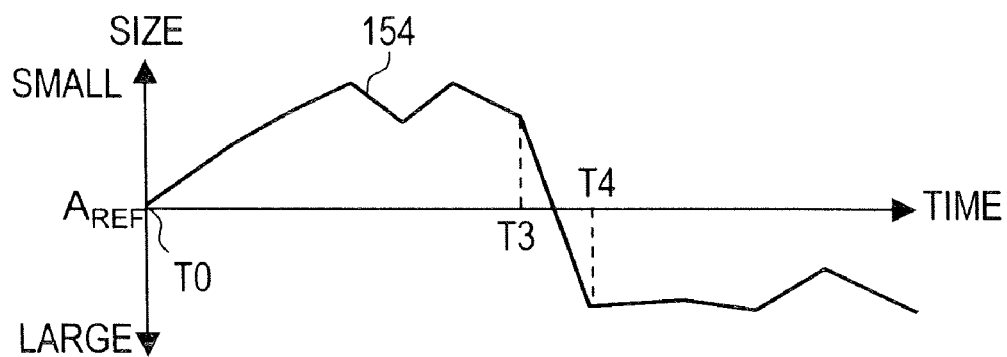

In FIGS. 17A and 17B, broken lines 153 and 154 represent time change in the size $A_s$ of the specific portion α calculated by the extraction processing of step S2. In each of FIGS. 17A and 17B, the horizontal axis represents time and the vertical axis represents the size $A_s$ calculated. The upward direction of the vertical axis corresponds to the direction in which the size $A_s$ decreases. In each of FIGS. 17A and 17B, timing T0 is timing at which the processing of step S1 of FIG. 5 is executed, timing T3 is timing at which the processing of step S2 of FIG. 5 is executed, and timing T4 is timing at which the processing of step S2 of FIG. 5 is executed after the timing T3.

As shown by the broken line 153 of FIG. 17A, even when the size $A_s$ changes with time, if the degree of this change is small, it is assumed that the change in the size $A_s$ is attributable to shake of the subject. In such a case, as described above, it is more convenient to keep the display size of the specific portion α constant. Thus, in such a case, the processing of steps S301 to 304 of FIG. 11 is executed.

On the other hand, as shown by the broken line 154 of FIG. 17B, when the size $A_s$ greatly changes, it is assumed that the person as the subject moves in the direction corresponding to this change. In such a case, as described above, providing a display in accordance with this movement more satisfies the subject's intent. Thus, in such a case, display in accordance with this movement is performed without executing the processing of steps S301 to 304 of FIG. 11.

Specifically, to realize the assumption described above, a required number of sizes $A_s$ calculated in the processing of step S2 are stored. Then, in step S300 of FIG. 11, the amount of change in the size $A_s$ per unit time is calculated with reference to the latest size $A_s$. For example, when the unit time is between the timing T3 and T4, a difference between the size $A_s$ at the timing T3 and the size $A_s$ at the timing T4 is calculated as the amount of change corresponding to the timing T4.

When this amount of change is smaller than a predetermined threshold amount of change, the processing of steps S301 to S304 of FIG. 11 is executed. On the contrary, when the amount of change is larger than the predetermined threshold amount of change, an output image is generated such that the size of the specific portion α on the display screen changes in accordance with the change in the size $A_s$ of the specific portion α in the photographed image without executing the processing of steps S301 to S304 (for example, the processing of step S306 or S307 may be executed).

If the second modified processing example is adopted, shake or the like not intended by the subject and movement intended by the subject can be discriminated from each other, thus providing an appropriate display in accordance with results of this discrimination.

[Third Modified Processing Example]

Next, the third modified processing example will be described. In the third modified processing example, based on the state of change in the direction of movement of the specific portion α in the photographed image or based on the state of change in the direction of movement of the related portion β in the photographed image, it is judged whether or not processing (change reduction processing) such as one corresponding to steps S301 to S304 of FIG. 11 can be executed. The specific portion α and the related portion β move in the photographed image in the same manner; therefore, this judgment can be made based on either of them.

For simplified description purposes, the third modified processing example will be described below focusing on, of the specific portion α and related portion β, the specific portion α. To perform the third modified processing example by using the related portion β, for necessary portions only, the specific portion α, the size $A_s$, and the reference size $A_{REF}$ can be read as the related portion β, the size $B_s$, and the reference size $B_{REF}$.

Figure 18A:
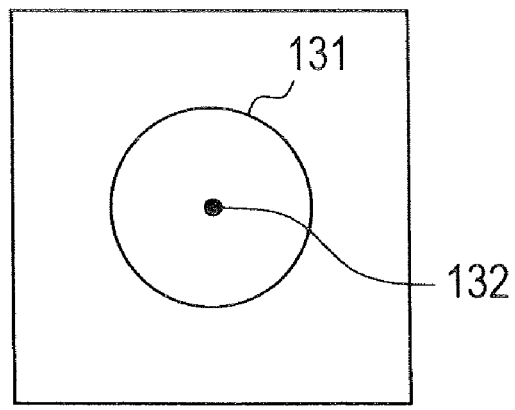
FIGS. 18A, 18B, and 18C are diagrams for explaining a third modified processing example as a modified example of the image output processing of FIG. 5.
Figure 18B:
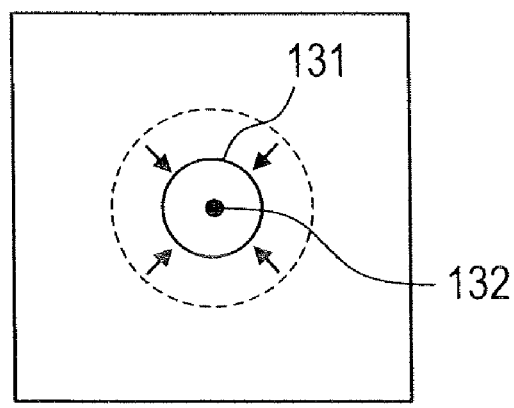
Figure 18C:
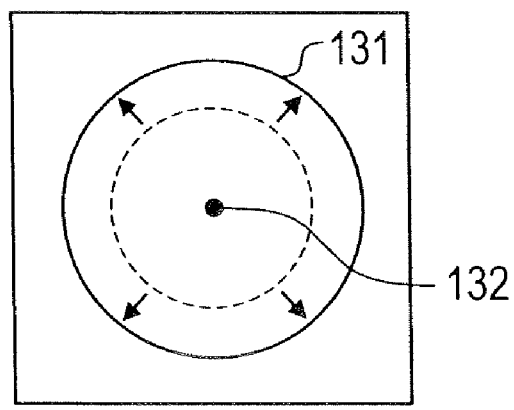

Referring to FIGS. 18A to 18C showing photographed images, principles of the third modified processing example will be described. In FIGS. 18A to 18C, numeral 131 represents a rigid body photographed. Numeral 132 represents the center of the rigid body 131 in the photographed image.

Now, assume a case where the rigid body 131 is photographed as a moving image with an angle of view fixed. An increase in the distance between the rigid body 131 and the image-taking apparatus 1 causes a change in the photographed image from FIG. 18A to FIG. 18B. In this case, the direction of a motion vector of the surrounding area of the rigid body 131 agrees with the direction from the outer side of the rigid body 131 toward the center 132. On the contrary, a decrease in the distance between the rigid body 131 and the image-taking apparatus 1 causes a change in the photographed image from FIG. 18A to FIG. 18C. In this case, the direction of the motion vector of the surrounding area of the rigid body 131 agrees with the direction from the center 132 toward the outer side of the rigid body 131.

Employing these principles, in the third modified processing example, required judgment processing is performed by referring to the direction of the movement of the specific portion α. To this end, for example, based on contrast between photographed images of adjacent frames, the motion vector of the specific portion α is detected for each frame by using a well-known representative matching method. The direction and magnitude of this motion vector represents the direction and magnitude of the movement of the surrounding area of the specific portion α between the photographed images of adjacent frames. The surrounding area of the specific portion α refers to a portion excluding the center of the specific portion α, for example, the outer periphery (contour) of the specific portion α.

Figure 19A:
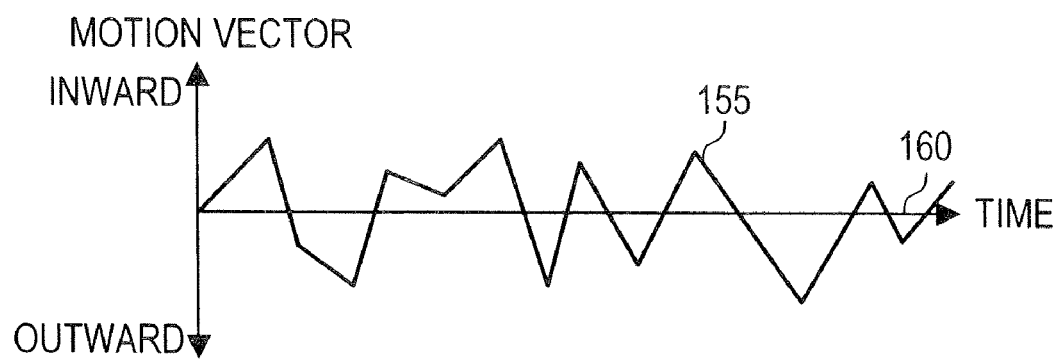
FIGS. 19A and 19B are diagrams for explaining the third modified processing example as the modified example of the image output processing of FIG. 5.
Figure 19B:
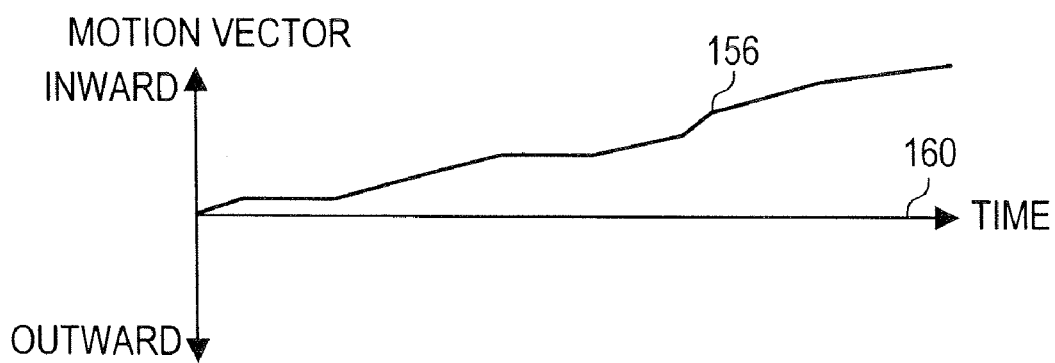

In FIGS. 19A and 19B, broken lines 155 and 156 represent time change in the direction and magnitude of the motion vector of the specific portion α. In each of FIGS. 19A and 19B, the horizontal axis represents time and a straight line 160 represents a case where the magnitude of the motion vector is zero. The portion above the straight line 160 corresponds to condition that the motion vector is directed inward of the specific portion α as shown in FIG. 18B, and the portion below the straight line 160 corresponds to condition that the motion vector is directed outward of the specific portion α as shown in FIG. 18C. It is indicated that the magnitude of the motion vector becomes increasingly larger toward the top (or bottom) from the straight line 160.

As shown by the broken line 155 of FIG. 19A, when the motion vector of the specific portion α is directed inward and outward of the specific portion α, it is assumed that this motion is attributable to shake of the subject. In such a case, as described above, it is more convenient to keep the display size of the specific portion α constant. Thus, in such a case, the processing of steps S301 to 304 of FIG. 11 is executed.

On the other hand, as shown by the broken line 156 of FIG. 19B, in cases such as where the motion vector of the specific portion α is continuously directed inward of the specific portion α, it is assumed that the person as the subject moves in the direction corresponding to this direction. In such a case, as described above, providing a display in accordance with this movement more satisfies the subject's intent. Thus, in such a case, display in accordance with this movement is performed without executing the processing of steps S301 to 304 of FIG. 11.

Specifically, every time when step S3 of FIG. 5 is executed, the direction of the motion vector of the specific portion α (and magnitude of the motion vector when necessary) is detected. This direction is a direction with respect to the center of the specific portion α. Now consider the photographed image shown in FIG. 7. When the specific portion α is the entire facial region corresponding to numeral 102, the center of the rectangle 102a can be assumed as the center of the specific portion α. When the specific portion α is the left eye corresponding to numeral 103, the center of the rectangle 103a can be assumed as the center of the specific portion α.

Then, the direction of the motion vector calculated for the current frame and the directions of the motion vector for (n−1) frames in the past with reference to the current frame are referenced (where n is an integer number). That is, n-number of directions of the motion vector including the latest direction of the motion vector are referenced. Then, when the directions directed toward the center of the specific portion α and the directions directed away from this center are mixed in the n-number of directions of the motion vector, the processing of steps S301 to S304 of FIG. 11 is executed.

On the other hand, when they are not mixed together and thus all the n-number of directions of the motion vector are directed to the center of the specific portion α or directed away from this center, the processing of steps S301 to S304 of FIG. 11 is not executed but an output image is generated such that the size of the specific portion α on the display screen changes in accordance with change in the size $A_s$ of the specific portion α in the photographed image (for example, the processing of step S306 or 307 of FIG. 11 may be executed).

If the third modified processing example is adopted, shake or the like not intended by the subject and movement intended by the subject can be discriminated from each other, thus providing an appropriate display in accordance with results of this discrimination.

In the description of FIG. 6, the specific portion α is determined in accordance with the key operation performed on the operation key 26c or the like. Alternatively, a mobile portion in the photographed image may be detected referring to a motion vector or the like and this mobile portion may be automatically set as the specific portion α.

The first embodiment assumes that the specific portion α is a facial region or a facial part. However, the specific portion α may be the entire person. In the photographed image, if the facial region of the person can be recognized, the entire person can be easily recognized. In addition, the person included in the photographed image may be detected by referring to the movement in the photographed image or the like.

[First Application Processing]

The above description is focused on the convenience in make-up. An application example as shown below is also useful. Processing performed in this application example is called "first application processing". The first application processing will be described below (part of the description of the first application processing overlaps with part of the description provided above).

In the first application processing, the specific portion α is defined as a facial region or a head region including the facial region. For example, the first application processing is executed by user's instructions provided to the image-taking apparatus 1 for executing the first application processing. Also in the first application processing, such registration processing that include the processing of steps S100 to S106 of FIG. 6 can be performed. Moreover, applying a well-known tracking method of tracking a tracking target within a moving image, the tracking target may be defined as a person including the specific portion α.

The recognition processing section 41 of FIG. 4 extracts a facial region corresponding to the specific portion α from photographed images sequentially obtained, and generates output images from the respective photographed images so that the size of the specific portion a in the output image of the output image generation section 43 of FIG. 4 is kept constant. Specifically, the processing including steps S301 to 304 of FIG. 11 may be executed. The aforementioned reference size referenced in this processing can be previously set in accordance with user operation. Alternatively, the reference size can be defined as a certain specified size. In this case, the entire body of the person corresponding to the specific portion α may be fit within the output image. Furthermore, the person corresponding to the specific portion α may be drawn at a substantially center of the output image (the position at which the image is cut out may be adjusted).

Figure 20:
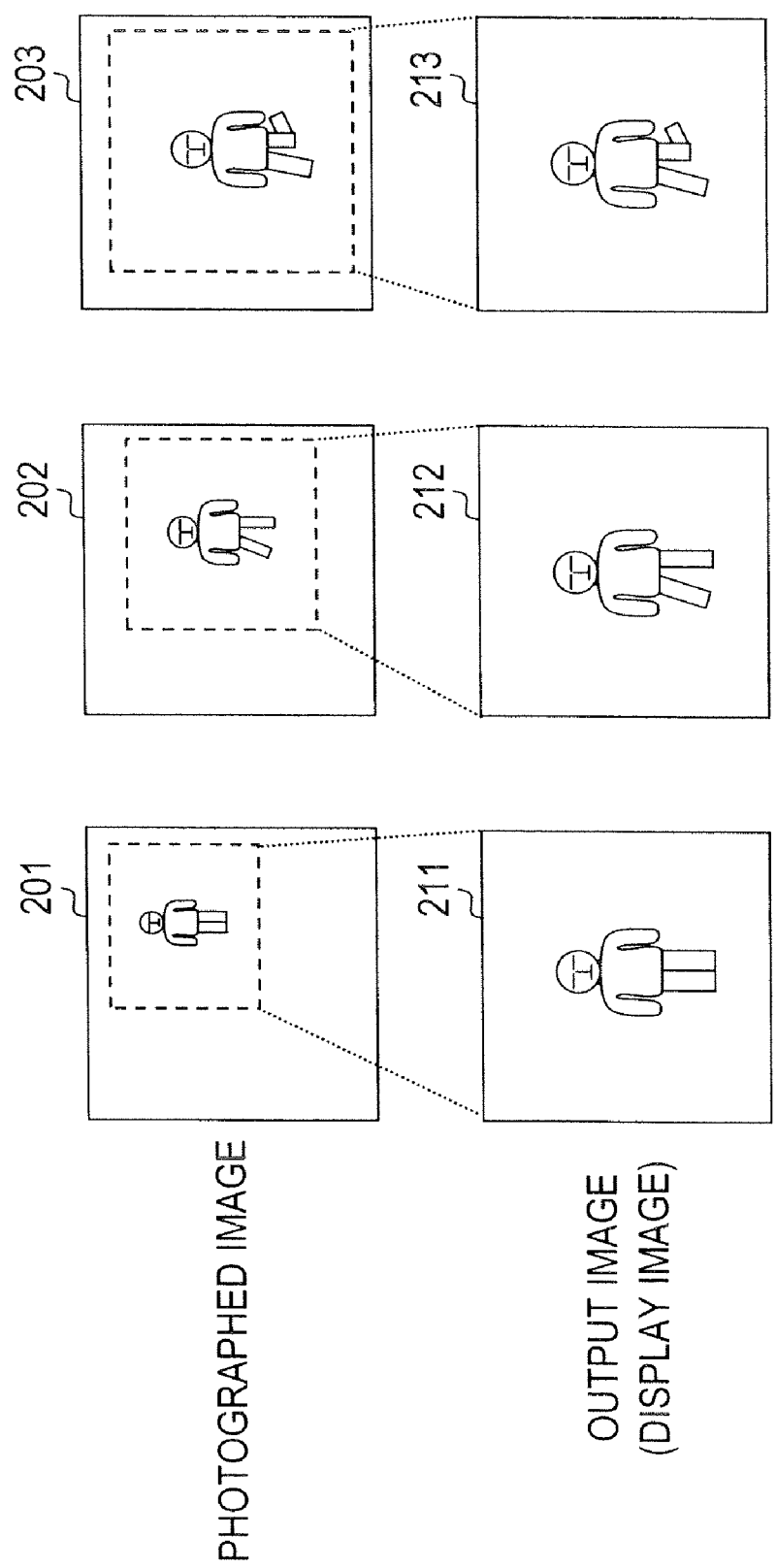
FIG. 20 is a diagram for explaining an applied example of the first embodiment of the invention, showing relationship between photographed images and output images (displayed images) in this applied example.

FIG. 20 shows an example of relationship between photographed images and output images (that is, images displayed on the display section 27) when the first application processing is executed. In FIG. 20, square boxes of solid lines numbered with numerals 201, 202, and 203 represent entire portions of photographed images in a first, a second, and a third frames, respectively. The second frame is a frame older than the third frame, and the first frame is a frame older than the second frame. In FIG. 20, within square boxes of solid lines numbered with numerals 211, 212, and 213, output images in the first, second, and third frames, respectively, (that is, images displayed in the display section 27) are represented. Broken lines in FIG. 20 show how the corresponding output images are cut out from the respective photographed images. As shown in FIG. 20, executing the first application processing permits the size of the person on the output image to be kept substantially constant.

It is also assumed that, upon start of photographing, the size of the facial region (person) corresponding to the specific portion α is extremely small in the photographed image. Performing, on the photographed image in such a state, the processing of keeping the size of the specific portion α constant results in greater deterioration in the resolution of the output image. Therefore, in such a case, it is advised that, until the size of the specific portion α reaches a predetermined threshold size, the processing of keeping the size of the specific portion α constant is prohibited.

[Second Embodiment]

Next, the second embodiment of the size adjustment function will be described. Those described in the first embodiment are also applicable to the second embodiment as long as no inconsistency arises.

In the second embodiment, change in the size (dimension) of a specific subject in the output image attributable to change in the distance in actual space between the subject and the image-taking apparatus 1 (image taking section 11) is reduced by adjusting the angle of view for photographing by the image taking section 11. To achieve this reduction in the change, so-called electronic zooming is employed in the first embodiment and so-called optical zooming is employed in the second embodiment. In the second embodiment, processing of adjusting the angle of view can be called change reduction processing.

Also in the size adjustment function according to the second embodiment, by using the same method as that described in the first embodiment, registration processing for a specific portion in focus is performed first. This specific portion is, for example, a whole part, a facial region, or a facial part of a person as a subject. Upon execution of the size adjustment function, for example, in synchronization with predetermined operation performed on the operation section 26, the whole part, facial region, or facial part of the person in a photographed image is extracted and the extracted whole part, facial region, or facial part of the person is set as a specific portion. Then, for example, the size of the facial region included in this specific portion, the size of the facial region as this specific portion, or the size of the facial region including this specific portion is calculated by the same processing as the processing of step S104 of FIG. 6. Here, the calculated size of the facial region is provided as a reference size.

If the specific portion (specific subject) is the whole part of the person, the facial region is treated as a related portion (related subject). The related portion, needless to say, moves relative to the movement of the specific portion α both in the actual space and a photographed image. A decrease in the size of the specific portion in the photographed image as a result of an increase in the distance between the person and the image-taking apparatus 1 results in a decrease in the size of the related portion in the photographed image accordingly. An increase in the size of the specific portion in the photographed image as a result of a decrease in this distance results in an increase in the size of the related portion in the photographed image accordingly.

Thereafter, by the same processing as the processing of step S2 of FIG. 5, the sizes of the facial regions in the photographed images of the respective frames are sequentially calculated, and then the angle of view is adjusted so that the sizes of the facial regions in the photographed images are kept substantially equal to the reference size described above. As a result, the sizes (dimensions) of the specific portions in the photographed images are kept substantially constant.

For example, the size of the facial region of the current frame is compared with the size of the facial region in the photographed image of the immediately preceding frame or the frame a couple of frames before the current frame. Then, if the former is larger than the latter, zooming-out is performed to provide the next frame and frames thereafter with angles of view larger than the angle of view of the current frame. On the contrary, if the former is smaller than the latter, zooming-in is performed to provide the next frame and frames thereafter with angles of view smaller than the angle of view of the current frame. If the both are equal (or substantially equal), the angle of view is not changed.

Zooming-in and zooming-out can be performed by moving the zoom lens 30 along the optical axis via the driver 34 of FIG. 2 by the CPU 23 of FIG. 1 functioning as the output image generation section 43 of FIG. 4. Zooming-out is operation for reducing an image of a subject formed on the image-sensing surface of the image sensor 33. Following this operation, the angle of view for photographing by the image taking section 11 increases. Zooming-in is operation for enlarging the image of the subject formed on the image-sensing surface of the image sensor 33. Following this operation, the angle of view for photographing by the image taking section 11 decreases. Needless to say, there is a limit on the range of change in the angle of view; therefore, no change is made in the angle of view exceeding this limit.

In the second embodiment, in accordance with size change of the subject in the photographed image, the angle of view is changed in such a direction that the aforementioned size change is canceled; therefore, the entire photographed image can be provided directly as an output image of the output image generation section 43 of FIG. 4. This output image, as is the case with the first embodiment, can be displayed on the display section 27 and also recorded onto the memory card 18.

For example, when the subject approaches closer to the image-taking apparatus 1 from a great distance, the subject usually extends off the photographing region unless the zoom factor or the like is adjusted manually during photographing. Moreover, when the subject located close to the image-taking apparatus 1 makes small movement in the direction in which the distance between the subject and the image-taking apparatus 1 changes, unless any correction is made on this, the dimension of the subject on the video changes after the movement, which causes a sense of discomfort upon viewing. However, the adjustment of the angle of view as described above alleviates such a trouble. Such a trouble is also alleviated by the processing of steps S301 to S304 of FIG. 11 in the first embodiment.

Contents of the first application processing described in the first embodiment can also be applied to the second embodiment. When the contents of the first application processing is applied to the second embodiment, reduction in the size change of the specific portion (specific subject) in the output image is just achieved through optical zooming. A method of reducing the size change through optical zooming is as described in the description of the second embodiment. However, in this case, as in the description of the first application processing, the angle of view may be adjusted so that the entire body of the person corresponding to the specific portion (specific subject) fits in the output image. In addition, since there is a limit on the optical zoom factor, as described in the first application processing, adjustment of an angle of view for keeping the size of the specific portion constant may be prohibited when the size of the specific portion is smaller than a predetermined threshold size.

[Modified Example, Etc.]

The image-taking apparatus 1 of FIG. 1 can be achieved by hardware or a combination of hardware and software. The function of the subject size adjustment section 40 of FIG. 4 in particular can be achieved by hardware, software, or a combination of hardware and software. All or part of the functions achieved by the subject size adjustment section 40 may be described as programs so that all or part of the functions are achieved by executing the programs on the computer.

In FIG. 4, the subject size adjustment section 40 functions as an image output section, and the recognition processing section 41 functions as a recognition section.

What is claimed is:

1. An image-taking apparatus comprising:
an image-taking section which sequentially performs photographing and sequentially outputs an image-taking signal representing a photographed image obtained by photographing; and
an image output section which receives the image-taking signal and sequentially generates and outputs an output image from the photographed image sequentially obtained,
wherein the image output section comprises
a recognition section which recognizes, based on the image-taking signal, a specific subject included in the photographed image,
wherein the image output section is configured to be capable of executing change reduction processing for reducing, based on a result of the recognition by the recognition section, change in a dimension of the specific subject in the output image due to change in a distance in an actual space between the specific subject and the image-taking section, and
wherein the image output section compares a predetermined reference dimension and a dimension of the specific subject in the photographed image and determines based on a result of the comparison whether or not to execute the change reduction processing, and
wherein, if the dimension of the specific subject is larger than an upper limit dimension determined as the reference dimension, the image output section prohibits the execution of the change reduction processing or, if the dimension of the specific subject is smaller than a lower limit dimension determined as the reference dimension, the image output section prohibits the execution of the change reduction processing.

2. The image-taking apparatus according to claim 1, further comprising a display section which displays the output image from the image output section,
wherein the image output section executes the change reduction processing to thereby reduce change in a dimension of the specific subject on a display screen of the display section due to change in the distance.

3. The image-taking apparatus according to claim 1,
wherein the image output section, based on the result of the recognition by the recognition section, evaluates the dimension of the specific subject in the photographed image or a dimension of a related subject which is included in the photographed image and which moves relative to movement of the specific subject, and then executes the change reduction processing based on the evaluated dimension.

4. The image-taking apparatus according to claim 3
wherein the image output section compares the upper limit dimension and the dimension of the specific subject or the related subject in the photographed image, and, if the dimension of the specific subject or the related subject is larger than the upper limit dimension, prohibits the execution of the change reduction processing to enlarge the dimension of the specific subject in the output image.

5. The image-taking apparatus according to claim 3,
wherein the image output section compares the lower limit dimension and the dimension of the specific subject or the related subject in the photographed image, and, if the dimension of the specific subject or the related subject is smaller than the lower limit dimension, prohibits the execution of the change reduction processing to reduce the dimension of the specific subject in the output image.

6. The image-taking apparatus according to claim 1, wherein, when the dimension of the specific subject in the photographed image changes due to change in the distance during execution of the change reduction processing, the image output section, based on the result of the recognition by the recognition section, controls an angle of view for photographing by the image-taking section after the change to thereby reduce the change in the dimension of the specific subject in the output image due to the change.

7. An output image generation method which receives from an image-taking section an image-taking signal representing a photographed image obtained by photographing and sequentially generates and outputs an output image from the photographed image sequentially obtained, the output image generation method comprising:

a recognition step which recognizes a specific subject included in the photographed image based on the image-taking signal;

a change reduction step which reduces, based on a result of the recognition by the recognition step, change in a dimension of the specific subject in the output image due to change in a distance in actual space between the specific subject and the image-taking section, and a determination step which compares a predetermined reference dimension and a dimension of the specific subject in the photographed image and determines based on a result of the comparison whether or not to execute the change reduction step, wherein, in the determination step, if the dimension of the specific subject is larger than an upper limit dimension determined as the reference dimension, the execution of the change reduction step is prohibited or, if the dimension of the specific subject is smaller than a lower limit dimension determined as the reference dimension, the execution of the change reduction step is prohibited.

* * * * *